(12) United States Patent
Alcaraz López et al.

(10) Patent No.: US 12,184,384 B2
(45) Date of Patent: Dec. 31, 2024

(54) BEAM-BASED CARRIER PHASE POSITIONING

(71) Applicant: NOKIA TECHNOLOGIES OY, Espoo (FI)

(72) Inventors: Onel Alcaraz López, Oulu (FI); Carlos Morais De Lima, Oulu (FI); Antti Tölli, Oulu (FI); Juha Pekka Karjalainen, Oulu (FI); Sami-Jukka Hakola, Kempele (FI); Timo Koskela, Oulu (FI); Jari Yrjänä Hulkkonen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/265,033

(22) PCT Filed: Jan. 21, 2021

(86) PCT No.: PCT/EP2021/051238
§ 371 (c)(1),
(2) Date: Jun. 2, 2023

(87) PCT Pub. No.: WO2022/156889
PCT Pub. Date: Jul. 28, 2022

(65) Prior Publication Data
US 2024/0039611 A1  Feb. 1, 2024

(51) Int. Cl.
*H04B 7/06* (2006.01)
(52) U.S. Cl.
CPC ....... *H04B 7/0696* (2023.05); *H04B 7/06958* (2023.05)
(58) Field of Classification Search
CPC .................................................. H04B 7/0696
(Continued)

(56) References Cited

U.S. PATENT DOCUMENTS 4,084,138 A * 4/1978 Wycoff ............... H04W 88/188
340/7.49
10,998,945 B1 * 5/2021 Baligh ..................... B07C 3/00
(Continued)

FOREIGN PATENT DOCUMENTS

WO  2021/037331 A1  3/2021

OTHER PUBLICATIONS

International Search Report & Written Opinion dated Oct. 14, 2021 corresponding to International Patent Application No. PCT/EP2021/051238.
(Continued)

*Primary Examiner* — Lihong Yu
(74) *Attorney, Agent, or Firm* — Robert P. Michal, Esq.; Carter, DeLuca & Farrell LLP

(57) ABSTRACT

Method comprising: •selecting a subset of one or more beam pairs among a set of beam pairs via which a terminal and a base station are associated, wherein for each of the beam pairs of the subset, a suitability of the respective beam pair is better than a suitability threshold; for each of the beam pairs of the subset: ••determining a respective set of at least two tones; ••performing a respective relative phase measurement based on the respective virtual wavelength to obtain a respective virtual phase difference; and at least one of •○reporting the respective set of at least two tones and the respective virtual phase difference to the base station; and •○estimating a respective distance between the terminal and a transmission reception point of the base station emitting the respective beam pair based on the respective virtual phase difference and the preliminary uncertainty region.

17 Claims, 15 Drawing Sheets

(58) Field of Classification Search
USPC .......................................................... 375/262
See application file for complete search history.

(56) References Cited

U.S. PATENT DOCUMENTS

| | | | |
|---|---|---|---|
| 2012/0051408 A1* | 3/2012 | Van Zelst ............ | H04B 7/0417 375/267 |
| 2018/0233055 A1* | 8/2018 | Damnjanovic ...... | G08G 5/0021 |
| 2020/0236495 A1* | 7/2020 | Lee ........................ | H04W 24/10 |
| 2020/0267507 A1 | 8/2020 | Chae et al. | |
| 2020/0396012 A1* | 12/2020 | Liu ...................... | H04B 17/382 |
| 2021/0067222 A1* | 3/2021 | Yang ..................... | H04W 72/53 |

OTHER PUBLICATIONS

CATT, "Further discussion of NR RAT-dependent DL Positioning," 3GPP Draft; R1-1901980, 3GPP TSG RAN WG1 Meeting #96, Athens, Greece, Feb. 25-Mar. 1, 2019, Mar. 1, 2019, pp. 1-30, XP051599674.

Chris Rizos et al., "Background and Recent Advances in the Locata Terrestrial Positioning and Timing Technology," Sensors 2019, vol. 19, No. 8, Apr. 16, 2019, p. 1821, XP055844300.

Media Tek, "On measurement aspect for NR positioning," 3GPP Draft; R1-1904501, 3GPP TSG RAN WG1 meeting #96bis, Xi'an, China Apr. 4-8, 2019, Apr. 3, 2019, XP051707241.

3GPP TS 36.455 V16.1.0 (Sep. 2020), Technical Specification, 3rd Generation Partnership Project; Technical Specification Group Radio Access Network; Evolved Universal Terrestrial Radio Access (E-UTRA); LTE Positioning Protocol A (LPPa) (Release 16), Sep. 2020.

3GPP TS 38.455 V16.2.0 (Jan. 2021), Technical Specification, 3rd Generation Partnership Project; Technical Specification Group Radio Access Network; NG-RAN; NR Positioning Protocol A (NRPPa) (Release 16), Jan. 2021.

Bupt et al., "Potential positioning enhancements," R1-2003701, 3GPP TSG RAN WG1 #101, e-Meeting, May 25-Jun. 5, 2020.

CATT, "Discussion of NR positioning enhancements," R1-2003642, 3GPP TSG RAN WG1 Meeting #101, e-meeting, May 25-Jun. 5, 2020.

Fraunhofer IIS et al., "Potential positioning enhancements," R1-2006460, 3GPP TSG RAN WG1 Meeting #102-e, e-Meeting, Aug. 17-28, 2020.

Media Tek Inc., "Views on Positioning enhancement for Rel-17," R1-2003669, 3GPP TSG-RAN WG1 #101 Meeting, e-Meeting, May 25-Jun. 5, 2020.

Patrick Henkel, "Reliable Carrier Phase Positioning," PhD Diss. Technische Universitat Munchen 2010. https://mediatum.ub.tum.de/doc/982097/982097.pdf.

* cited by examiner

BEAM-BASED CARRIER PHASE POSITIONING

FIELD OF THE INVENTION

The present disclosure relates to positioning.
Abbreviations
 3GPP 3$^{rd}$ Generation Partnership Project
 4G/5G/6G 4$^{th}$/5$^{th}$/6$^{th}$ Generation
 AoA Angle of Arrival
 AoD Angle of Departure
 CDF Cumulative Distribution Function
 CN Core Network
 CU Centralized Unit
 C-PRS Carrier-PRS
 CSI Channel State Information
 C-SRS Carrier-SRS
 DCI Downlink Control Information
 DL Downlink
 DMRS Demodulation Reference Signal
 GNSS Global Navigation Satellite System
 gNB New Generation NodeB
 LMF Location Management Function
 LoS Line-of-Sight
 LTE Long-Term Evolution
 NLOS Non Line-of-Sight
 NR New Radio
 NZP-CSI-RS Non-zero-power CSI RS
 OTDOA Observed Time Difference of Arrival
 PDSCH Physical downlink shared channel
 PDCHH Physical downlink control channel
 PLL Phase-locked loop
 PRS Positioning Reference Signal
 PTRS Phase Tracking Reference Signal
 RAN Radio Access Network
 RS Reference Signal
 RX Receive
 RSTD Reference Signal Time Difference
 RSRP Reference Signal Received Power
 SRS Sounding Reference Signal
 SSB Synchronization Signal Block
 TDOA Time Difference of Arrival
 TOA Time of Arrival
 ToF Time of Flight
 TRP Transmission Reception Point
 TX Transmit
 UE User Equipment

BACKGROUND OF THE INVENTION

GNSS uses carrier phase-based techniques to provide high positioning accuracy. The accuracy of the carrier phase measured at a GNSS receiver can be established via the standard deviation of the measurement error, which is given by [REF 5, Eq. (1.15)]

$$\sigma_i = \frac{\lambda_i}{2\pi}\sqrt{\frac{B_L}{C/N_0}\left(1 + \frac{1}{2TC/N_0}\right)}, \quad (1)$$

assuming the carrier phase is tracked by a PLL. In (1), $B_L$, is the one-sided bandwidth of the loop filter of the PLL, T is the integration time of the PLL, C is the received power (received at the PLL) and $N_0$ is the noise spectral density received at the PLL. (Typical values in GNSS receivers are: $B_L$=20 Hz and T=20 ms, which for $C/N_0$, =45 dB-Hz and λ=19 cm, one attains $\sigma_i \approx$ 1 mm).

However, carrier phase is cyclic (it revolves around a 2π period) and requires the resolution of an integer ambiguity for each transmitter, in this case a satellite. By taking phase measurements corresponding to a single carrier $f_i$, transmission, the integer ambiguity phenomenon due to the periodicity of the carrier phase (the integer number of cycles between the transmitter and the receiver is unknown, i.e. only a fractional part can be measured), is difficult, if not impossible, to overcome. As the ambiguity problem becomes more predominant if the carrier wavelength is small, the received carrier phases on multiple frequencies may be linearly combined to achieve a larger artificial wavelength, called virtual wavelength. This results in a larger distance between the wavefronts, and by further exploiting the prior positioning information, one may identify and then discard less likely ambiguity-based solutions. This is illustrated in FIG. 1.

FIG. 1a shows wavefronts (parallel lines) for single carrier transmission, and FIG. 1b shows wavefronts (parallel lines) for multi-carrier transmissions. In case of the latter, rather than the individual wavefronts having the wavelengths $\lambda_i$, $\lambda_j$, it is shown the virtual wavefront having the wavelength $\lambda_v (\lambda_v > \lambda_i, \lambda_j)$ from combining the carrier phases measurements on the multiple frequencies ($\lambda_v^{-1}=\lambda_i^{-1}-\lambda_j^{-1}$). This is a well-known phenomenon exploited in GNSS systems. The circle area in FIG. 1 denotes a prior raw information on the positioning region, which can be used to limit the infinite search space: $p_0$ is an assumed position of the target device, and ρ is the radius of the uncertainty region determined by the prior raw (preliminary) positioning estimate, e.g., coming from TOA measurements, etc. ρ may be related to the standard deviation σ_t of the preliminary positioning estimation. In this case, it depends on the desired certainty level. For instance, ρ=σ_t can be interpreted as a device positioned around $p_0$ with radius less than ρ with certainty of 68%; while ρ=2σ_t can be interpreted as a device positioned around $p_0$ with radius less than p with certainty of 95%.

We assume a circular uncertainty area for simplicity and illustration purposes only.

These and the following considerations are for the case of single or double carrier transmissions, but they can be extended to the scenarios with more than two carrier transmissions per beam pair.

The 'virtual' phase measurement error corresponding to the combination of two carrier phase measurements is given by [REF 3]

$$w_v = \frac{w_i\lambda_j - w_j\lambda_i}{\lambda_j - \lambda_i}, \quad (2)$$

where $w_i$ is the measurement error corresponding to $f_i$ and with standard deviation given in (1). Then, the standard deviation of the 'virtual' phase measurement error is given by $$\sigma_v = \frac{1}{\lambda_j - \lambda_i}(\sigma_i\lambda_j + \sigma_j\lambda_i) \quad (3)$$

$$= \frac{\lambda_v}{2\pi}\left(\sqrt{\frac{B_{L_i}}{C_i/N_0}\left(1 + \frac{1}{2T_iC_i/N_0}\right)} + \sqrt{\frac{B_{L_j}}{C_j/N_0}\left(1 + \frac{1}{2T_jC_j/N_0}\right)}\right).$$

Meanwhile, the basic idea for downlink positioning with the NR carrier phase measurements has been discussed in [REF 3], and the system model is illustrated in FIG. 2. As shown in FIG. 2, a UE may receive positioning reference signals (PRS, C-PRS) from plural gNBs (e.g. gNB1, gNB2, gNB3) and, thus, determine its distance from these gNBs. The location of the UE may be determined from these distances by triangulation.

In detail, the gNBs inform the UE about the specific carriers, which are known as carrier phase positioning reference signal (C-PRS), to tune in. The C-PRS can be a pure carrier wave of sinusoidal signals at a pre-configured or pre-defined carrier frequency placed within the guard intervals of the frequency bands for transmission of user data, control data or reference signals or even within these frequency bands, e.g. at the center frequency of such a frequency band (C-PRS modulated with random sequences can also be considered). The UE takes then the phase measurements for each C-PRS, which can be carried out simultaneously if the C-PRS are cell-specific and UE capabilities allow it. The measurements may be processed/pre-processed at the UE or/and sent back to a gNB for its definite processing. This would depend on where the ultimate positioning decisions are taken, at the network (LMF) or UE side. In addition or alternatively, UE may use other reference signals such as NZP-CSI-RS for tracking, CSI acquisition, beam management, and/or PSS and/or SSS, and/or SSB, and/or DMRS, and/or a newly defined reference signal.

The basics on how to avoid the integer ambiguity problem and combine different positioning-related measurements have been also presented in [REF 3], together with an analysis of the impact of clock errors and how to mitigate them using differential techniques.

The reference positioning architecture according to 3GPP mainly comprises User Equipment (UE), Radio Access Network (RAN) and Centralized Unit (CU)/Core Network (CN) with positioning server and service client. The localization information can be requested by and/or reported to a UE or the core network. 3GPP specified the control plane and signalling strategies to exchange the positioning information between the UE, the network nodes and the positioning server [REF 1, REF 2]. Legacy Long-Term Evolution (LTE) systems introduced the Positioning Reference Signal (PRS) since Release 9, which allows to precisely measure the Observed Time Difference of Arrival (OTDOA) for localization when detecting signals from multiple neighbouring cells.

In Rel-17 NR, there is initial discussion regarding tone carrier-phase measurements and their potential merits for more accurate position estimates [REF 3]. Eventually, this may demand introducing some form of new reference signals, e.g. C-PRS (for downlink) or C-SRS (for uplink), using dedicated carriers on different points of the spectrum. The dedicated carriers might be sinusoids and, hence, may have an extremely small bandwidth.

REFERENCES

[REF 1] TS 36.555, "Evolved Universal Terrestrial Radio Access (E-UTRA); LTE Positioning Protocol (LPP)"

[REF 2] TS 38.455, "NG-RAN; NR Positioning Protocol A (NRPPa)"

[REF 3] TSG RAN WG1 Meeting #101-#102, R1-2003642: "Discussion of NR positioning enhancements", R1-2003669: "Views on Positioning enhancement for Rel-17", R1-2003701: "Potential positioning enhancements", R1-2006460: "Potential positioning enhancements"

[REF 4] PCT/EP2019/072634

[REF 5] P. Henkel, "Reliable Carrier Phase Positioning." PhD diss. Technische Universitat Munchen (2010). https://mediatum.ub.tum.de/doc/982097/982097.pdf

SUMMARY OF THE INVENTION

It is an object of the present invention to improve the prior art.

According to a first aspect of the invention, there is provided an apparatus comprising:

one or more processors, and memory storing instructions that, when executed by the one or more processors, cause the apparatus to:

select a subset of one or more beam pairs among a set of beam pairs via which a terminal and a base station are associated, wherein for each of the beam pairs of the subset, a suitability of the respective beam pair is better than a suitability threshold;

for each of the beam pairs of the subset:

determine a respective set of at least two tones;

perform a respective relative phase measurement based on the respective virtual wavelength to obtain a respective virtual phase difference; and at least one of report the respective set of at least two tones and the respective virtual phase difference to the base station; and estimate a respective distance between the terminal and a transmission reception point of the base station emitting the respective beam pair based on the respective virtual phase difference and the preliminary uncertainty region.

According to a second aspect of the invention, there is provided an apparatus comprising:

one or more processors, and memory storing instructions that, when executed by the one or more processors, cause the apparatus to:

select a subset of two or more beam pairs among a set of beam pairs via which a terminal and a base station are associated, wherein for each of the beam pairs of the subset, a suitability of the respective beam pair is better than a suitability threshold;

for each of the beam pairs of the subset:

determine a respective set of at least one tone to generate a respective non-local virtual wavelength from one of the tones of the set of at least one tone and a tone of another beam of the subset;

perform a respective relative phase measurement based on the respective non-local virtual wavelength to obtain a respective non-local virtual phase difference; and at least one of report the set of tones, the respective beam pair and the other beam pair, and the respective non-local virtual phase difference to the base station; and estimate a respective distance between the terminal and a transmission reception point of the base station emitting the respective beam pair based on the respective non-local virtual phase difference and the preliminary uncertainty region.

According to a third aspect of the invention, there is provided an apparatus comprising:
one or more processors, and
memory storing instructions that, when executed by the one or more processors, cause the apparatus to:
receive, from a base station, an indication of a subset of one or more beam pairs among a set of beam pairs via which a terminal and the base station are associated;
for each of the beam pairs of the subset:
receive an indication of a respective set of at least two tones from the base station;
perform a respective relative phase measurement based on a respective virtual wavelength from the at least two tones to obtain a respective virtual phase difference; and at least one of
report the respective virtual phase difference to the base station; and
estimate a respective distance between the terminal and a transmission reception point of the base station emitting the respective beam pair based on the respective virtual phase difference and the preliminary uncertainty region.

According to a fourth aspect of the invention, there is provided an apparatus comprising:
one or more processors, and
memory storing instructions that, when executed by the one or more processors, cause the apparatus to:
receive, from a base station, an indication of a subset of two or more beam pairs among a set of beam pairs via which a terminal and the base station are associated;
for each of the beam pairs of the subset:
receive an indication of a respective set of at least one tone from the base station;
perform a respective relative phase measurement based on a respective non-local virtual wavelength generated from the tones of two beams of the subset to obtain a respective non-local virtual phase difference; and at least one of
report the respective non-local virtual phase difference to the base station; and
estimate a respective distance between the terminal and a transmission reception point of the base station emitting the respective beam pair based on the respective non-local virtual phase difference and the preliminary uncertainty region.

According to a fifth aspect of the invention, there is provided an apparatus comprising:
one or more processors, and
memory storing instructions that, when executed by the one or more processors, cause the apparatus to:
select a subset of one or more beam pairs among a set of beam pairs via which a terminal and a base station are associated, wherein for each of the beam pairs of the subset, a suitability of the respective beam pair is better than a suitability threshold;
for each of the beam pairs of the subset:
determine a respective set of at least two tones;
transmit the respective at least two tones;
inform the terminal on the determined subset of beams and the respective tones.

According to a sixth aspect of the invention, there is provided an apparatus comprising:
one or more processors, and
memory storing instructions that, when executed by the one or more processors, cause the apparatus to:
select a subset of two or more beam pairs among a set of beam pairs via which a terminal and a base station are associated, wherein for each of the beam pairs of the subset, a suitability of the respective beam pair is better than a suitability threshold;
for each of the beam pairs of the subset:
determine a respective set of at least one tone;
transmit the respective at least one tone;
inform the terminal on the determined subset of beams and the respective at least one tone.

According to a seventh aspect of the invention, there is provided a method comprising:
selecting a subset of one or more beam pairs among a set of beam pairs via which a terminal and a base station are associated, wherein for each of the beam pairs of the subset, a suitability of the respective beam pair is better than a suitability threshold;
for each of the beam pairs of the subset:
determining a respective set of at least two tones;
performing a respective relative phase measurement based on the respective virtual wavelength to obtain a respective virtual phase difference; and at least one of
reporting the respective set of at least two tones and the respective virtual phase difference to the base station; and
estimating a respective distance between the terminal and a transmission reception point of the base station emitting the respective beam pair based on the respective virtual phase difference and the preliminary uncertainty region.

According to an eighth aspect of the invention, there is provided a method comprising:
selecting a subset of two or more beam pairs among a set of beam pairs via which a terminal and a base station are associated, wherein for each of the beam pairs of the subset, a suitability of the respective beam pair is better than a suitability threshold;
for each of the beam pairs of the subset:
determining a respective set of at least one tone to generate a respective non-local virtual wavelength from one of the tones of the set of at least one tone and a tone of another beam of the subset;
performing a respective relative phase measurement based on the respective non-local virtual wavelength to obtain a respective non-local virtual phase difference; and at least one of
reporting the set of tones, the respective beam pair and the other beam pair, and the respective non-local virtual phase difference to the base station; and
estimating a respective distance between the terminal and a transmission reception point of the base station emitting the respective beam pair based on the respective non-local virtual phase difference and the preliminary uncertainty region.

According to a ninth aspect of the invention, there is provided a method comprising:
receiving, from a base station, an indication of a subset of one or more beam pairs among a set of beam pairs via which a terminal and the base station are associated;
for each of the beam pairs of the subset:
receiving an indication of a respective set of at least two tones from the base station;
performing a respective relative phase measurement based on a respective virtual wavelength from the at least two tones to obtain a respective virtual phase difference; and at least one of reporting the respective virtual phase difference to the base station; and estimating a respective distance between the terminal and a transmission reception point of the base station emitting the respective beam pair based on the respective virtual phase difference and the preliminary uncertainty region.

According to a tenth aspect of the invention, there is provided a method comprising:

receiving, from a base station, an indication of a subset of two or more beam pairs among a set of beam pairs via which a terminal and the base station are associated;

for each of the beam pairs of the subset:

receiving an indication of a respective set of at least one tone from the base station;

performing a respective relative phase measurement based on a respective non-local virtual wavelength generated from the tones of two beams of the subset to obtain a respective non-local virtual phase difference; and at least one of reporting the respective non-local virtual phase difference to the base station; and estimating a respective distance between the terminal and a transmission reception point of the base station emitting the respective beam pair based on the respective non-local virtual phase difference and the preliminary uncertainty region.

According to an eleventh aspect of the invention, there is provided a method comprising:

selecting a subset of one or more beam pairs among a set of beam pairs via which a terminal and a base station are associated, wherein for each of the beam pairs of the subset, a suitability of the respective beam pair is better than a suitability threshold;

for each of the beam pairs of the subset:
determining a respective set of at least two tones;
transmitting the respective at least two tones;
inform the terminal on the determined subset of beams and the respective tones.

According to a twelfth aspect of the invention, there is provided a method comprising:

selecting a subset of two or more beam pairs among a set of beam pairs via which a terminal and a base station are associated, wherein for each of the beam pairs of the subset, a suitability of the respective beam pair is better than a suitability threshold;

for each of the beam pairs of the subset:
determining a respective set of at least one tone;
transmitting the respective at least one tone;
informing the terminal on the determined subset of beams and the respective at least one tone.

Each of the methods of the seventh to twelfth aspects may be a method for positioning.

According to a thirteenth aspect of the invention, there is provided a computer program product comprising a set of instructions which, when executed on an apparatus, is configured to cause the apparatus to carry out the method according to any of the seventh to twelfth aspects. The computer program product may be embodied as a computer-readable medium or directly loadable into a computer.

According to some embodiments of the invention, at least one of the following advantages may be achieved:
more accurate positioning in case UE and gNB are associated through several beams.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

Figure 5:
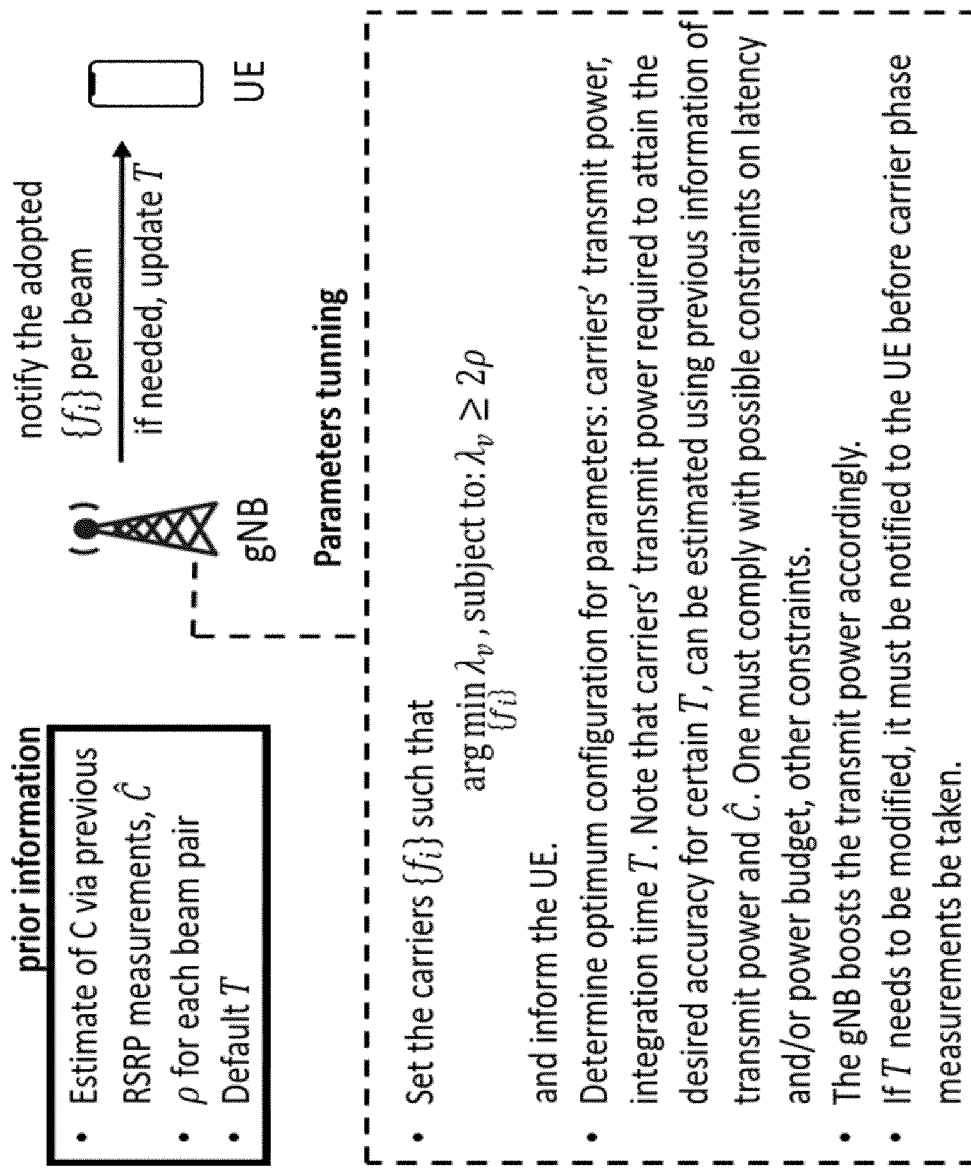
Figure 6:
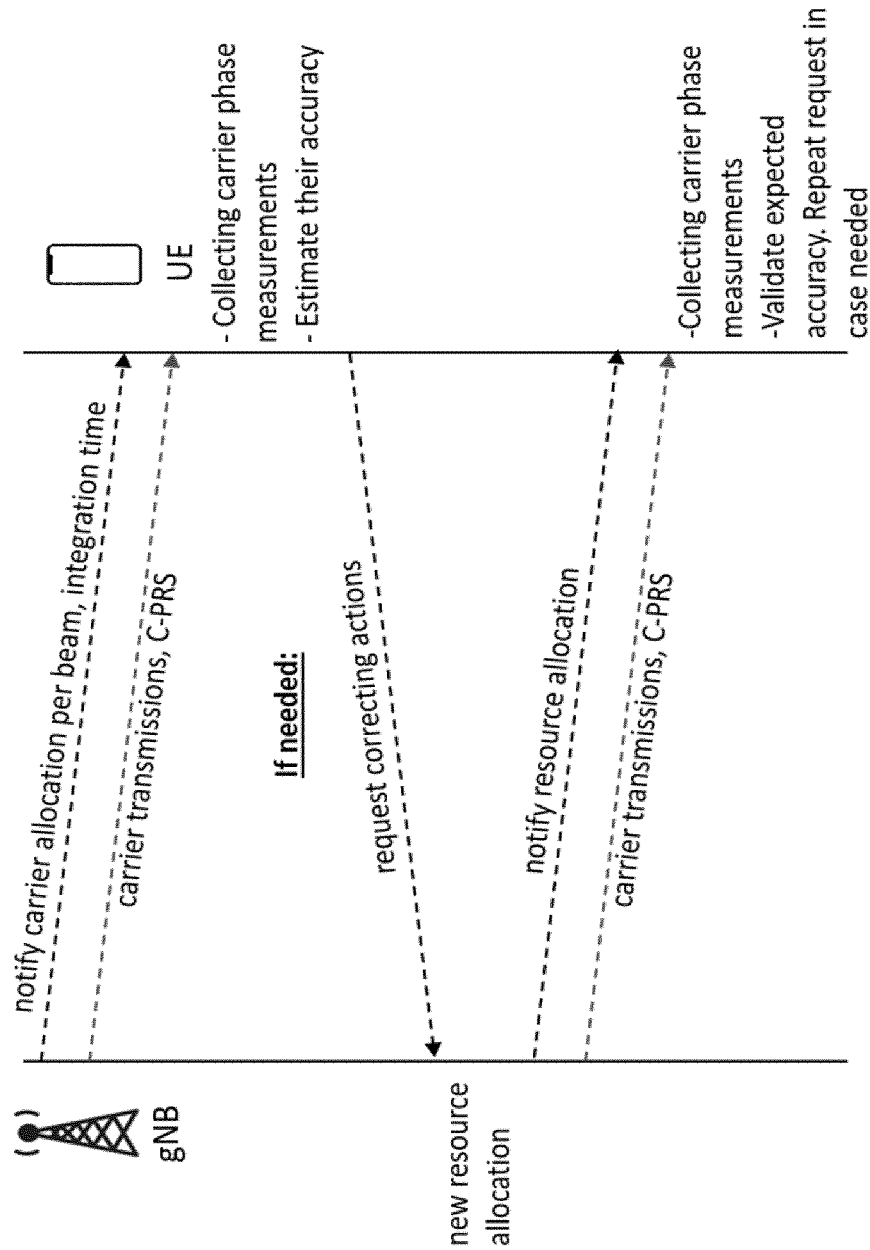
Figure 7:
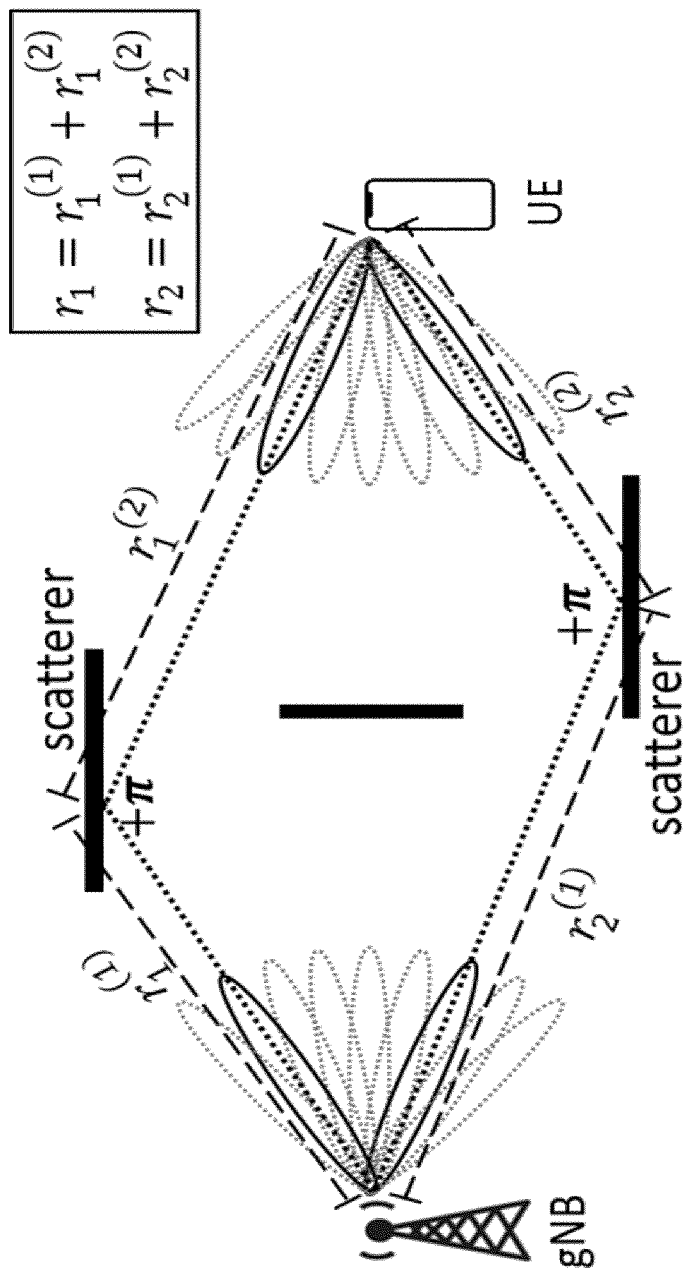
Figure 8:
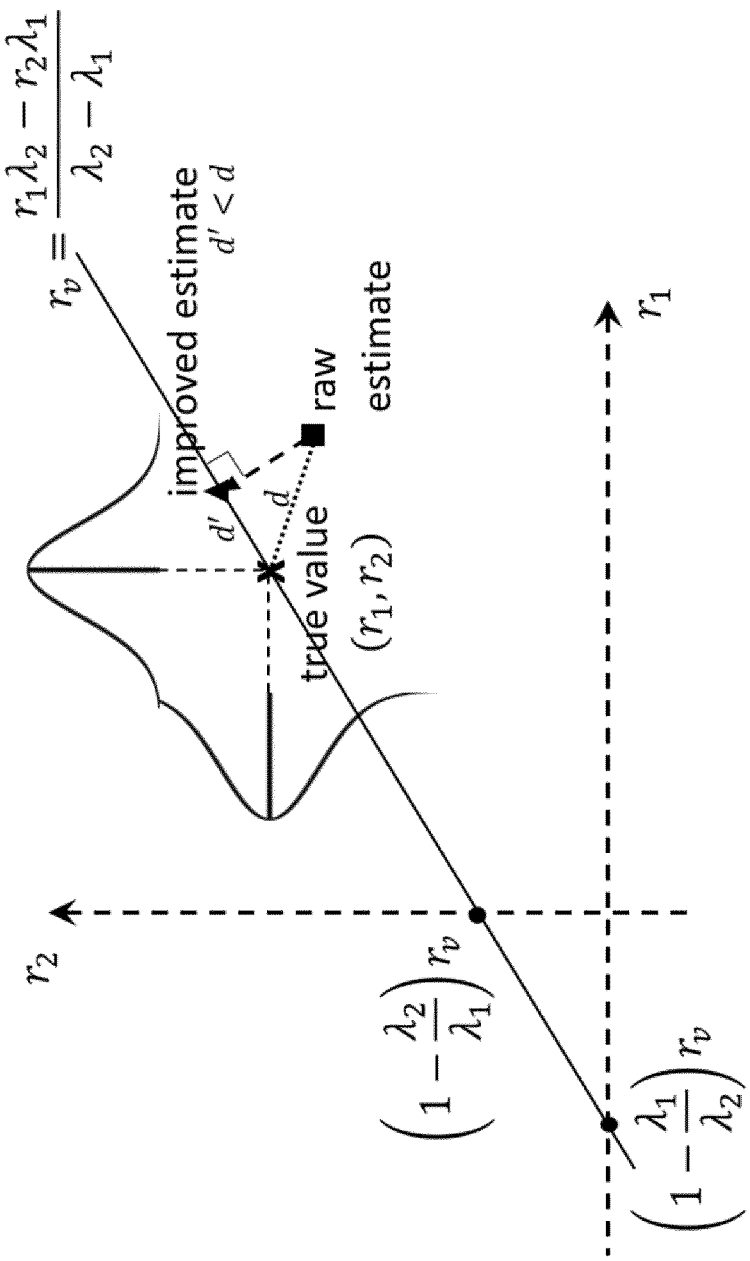
Figure 9:
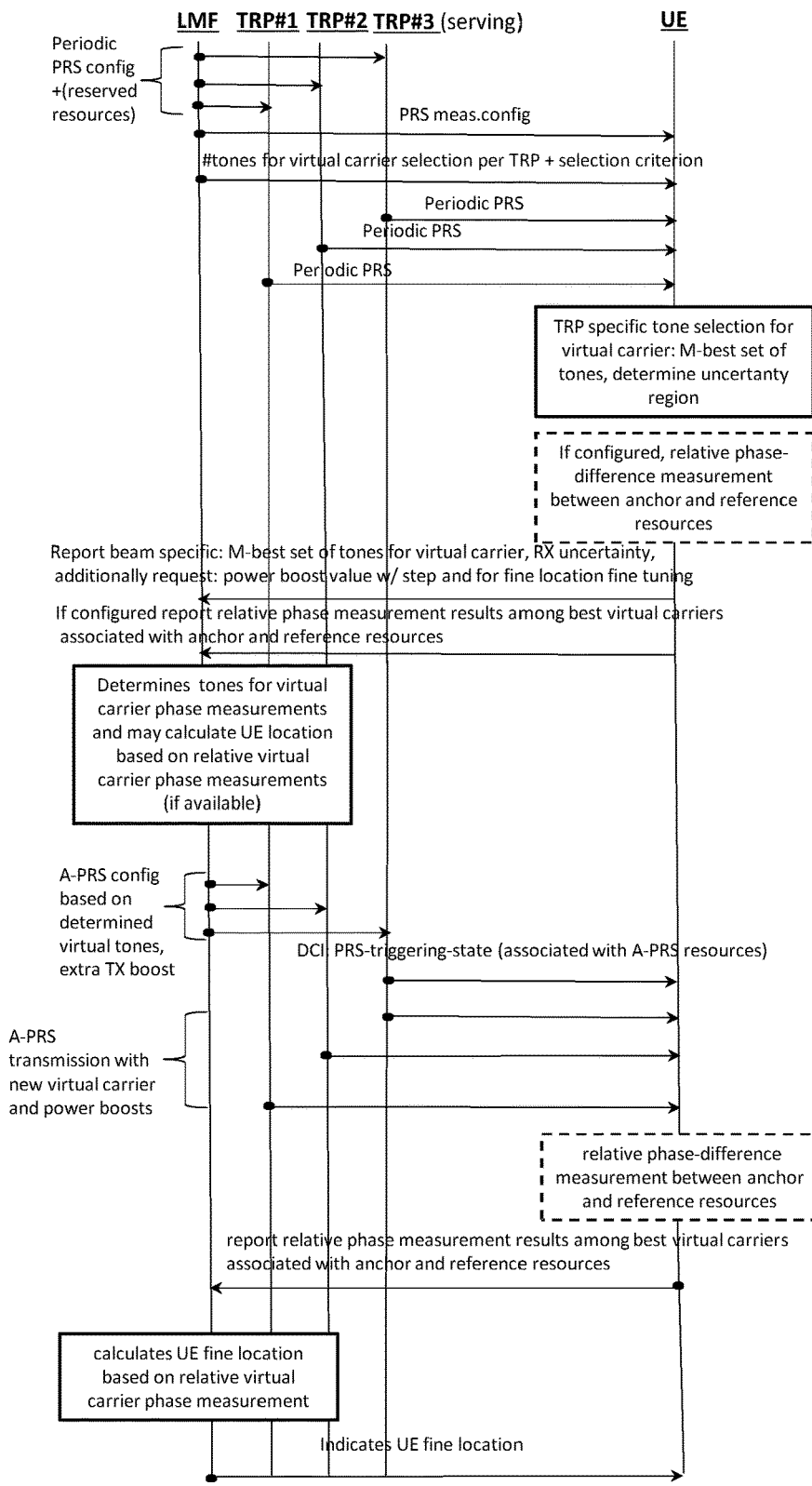
Figure 11:
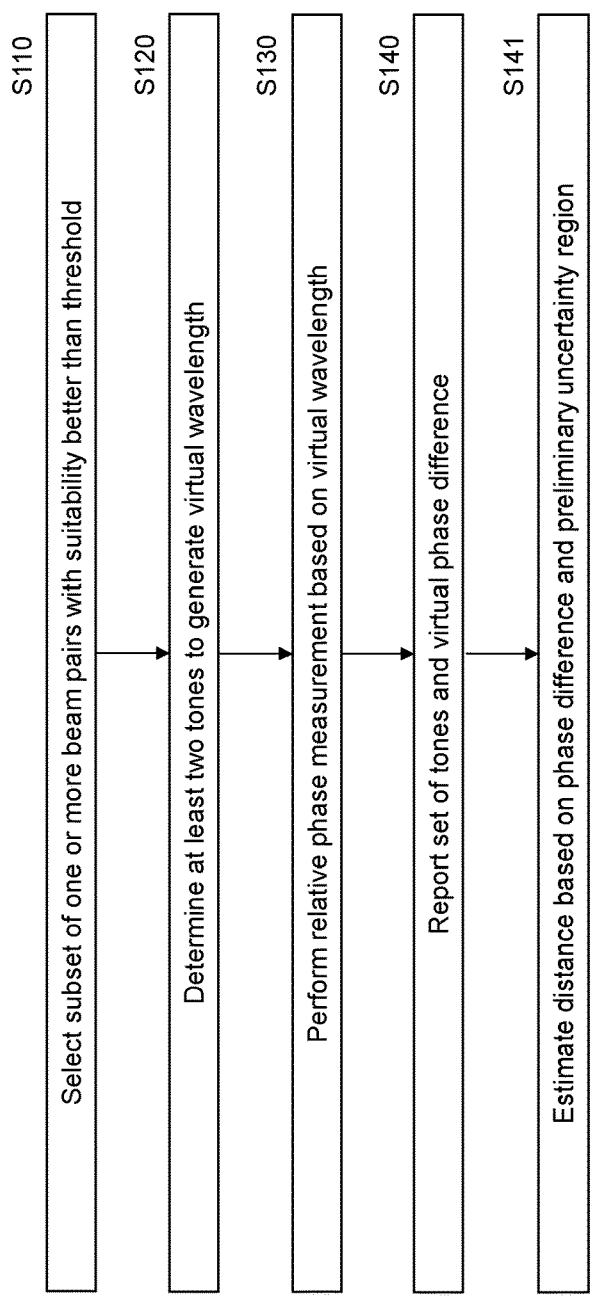
Figure 10:
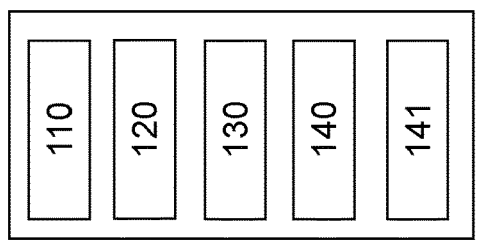
Figure 13:
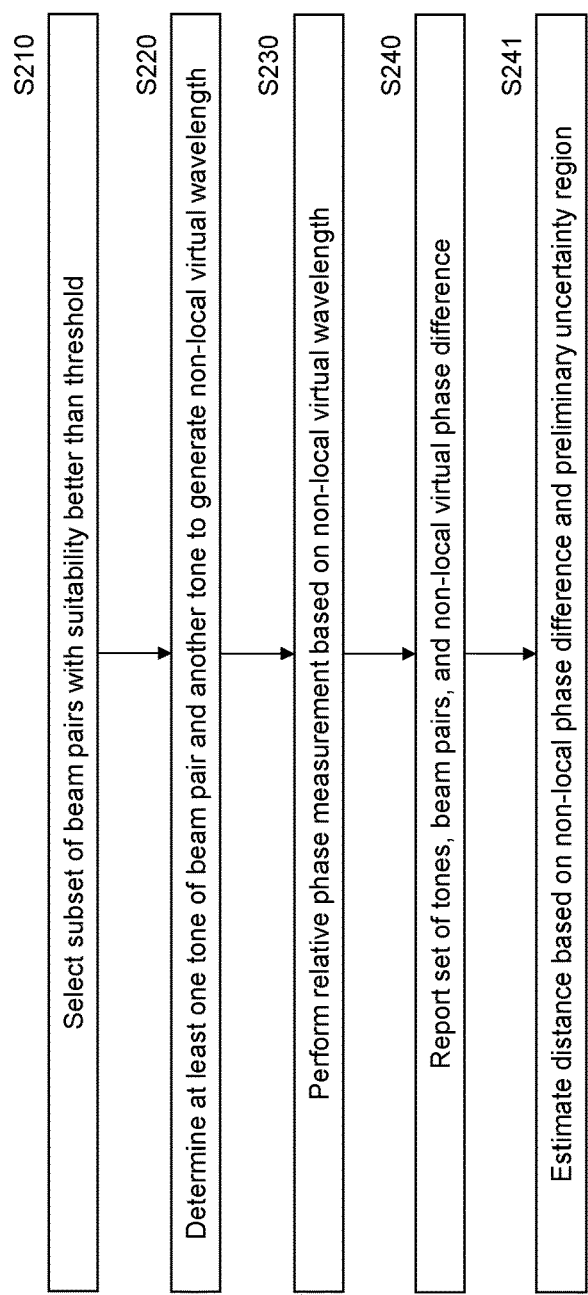
Figure 12:
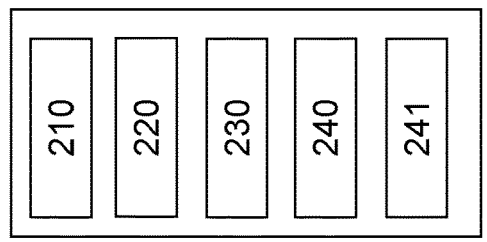
Figure 15:
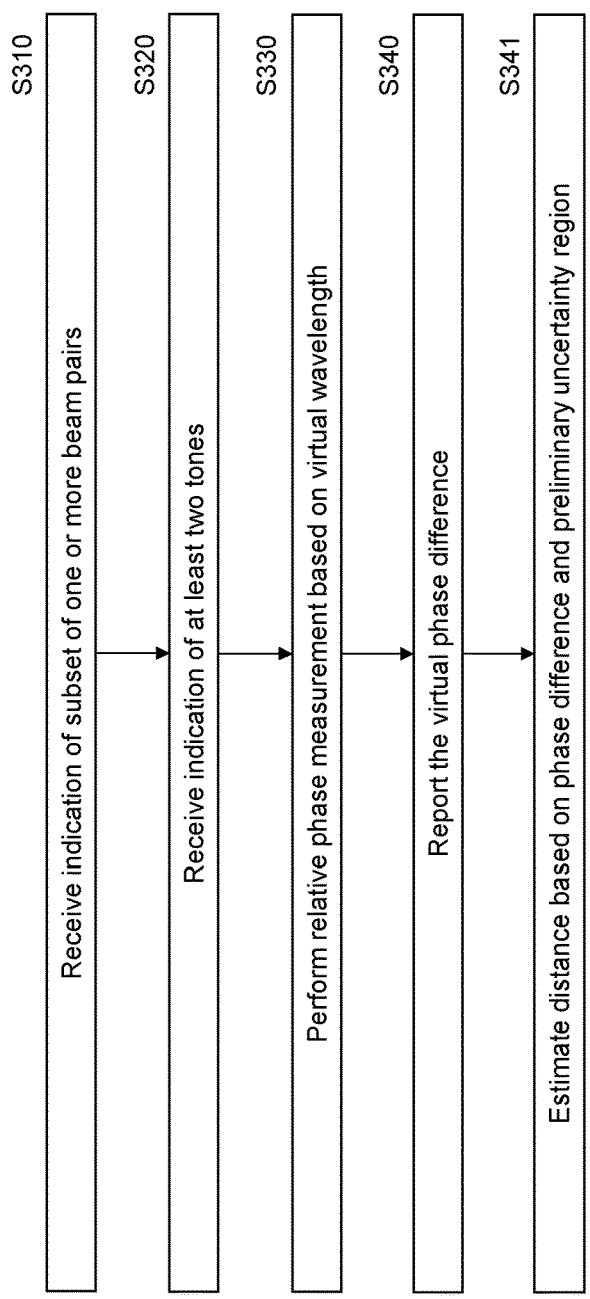
Figure 14:
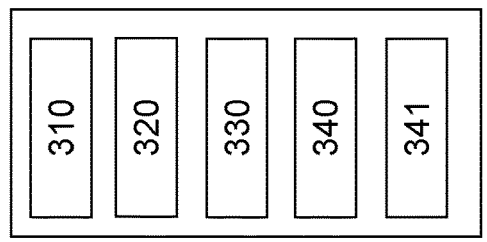
Figure 17:
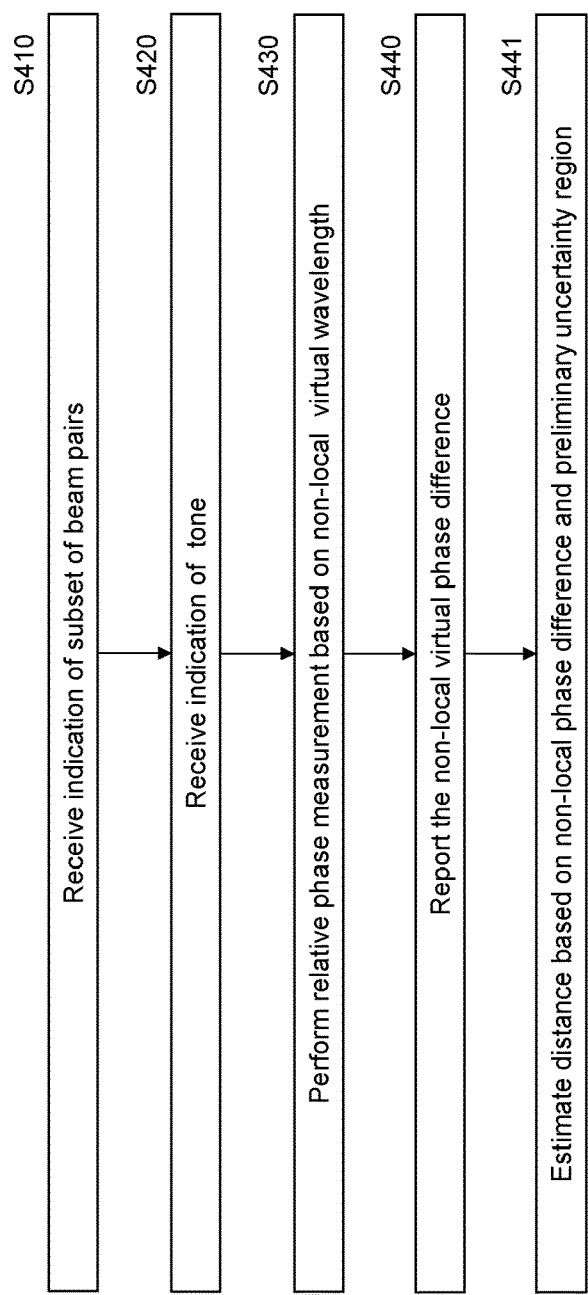
Figure 16:
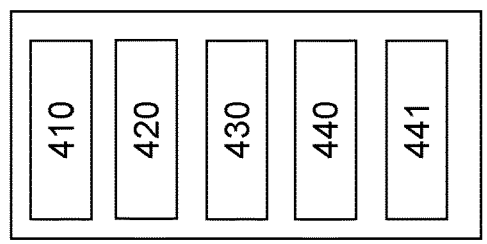
Figure 19:
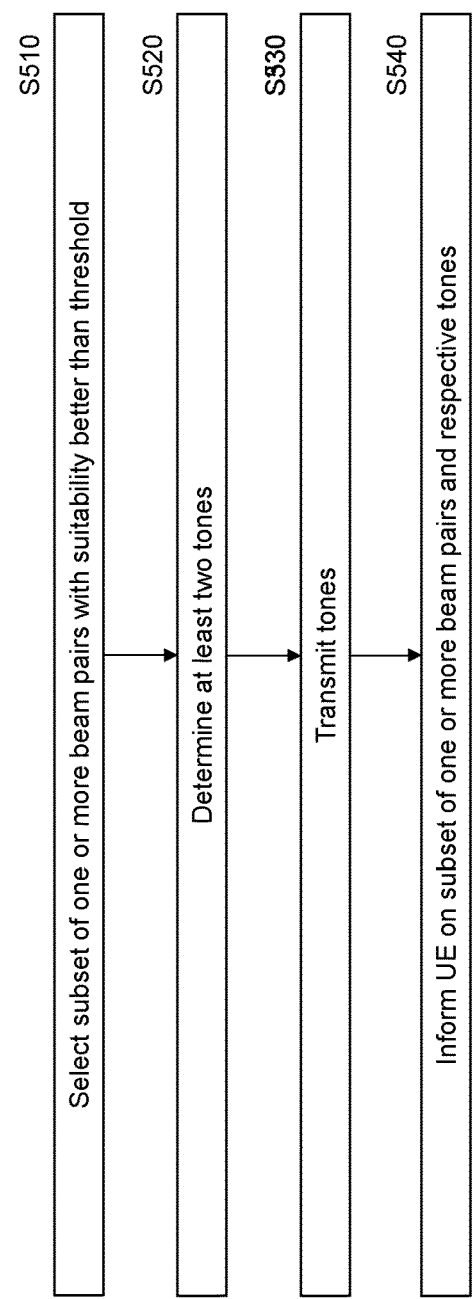
Figure 18:
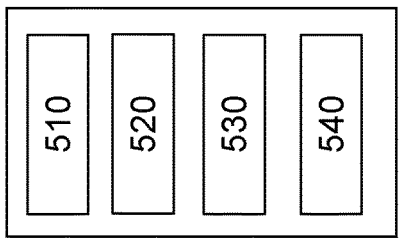
Figure 21:
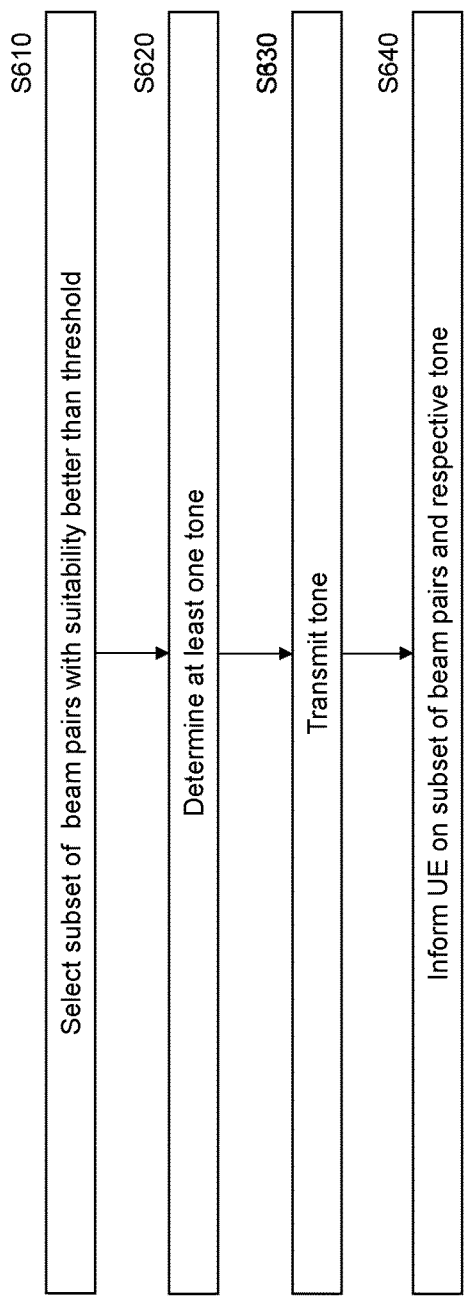
Figure 20:
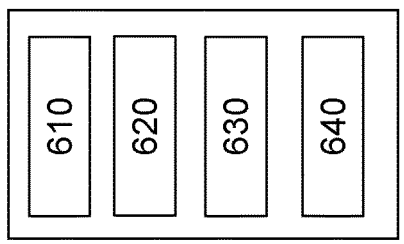

FIG. 5 illustrates a (open loop) scheduling procedure according to some example embodiments of the invention;

FIG. 6 illustrates a (closed loop) scheduling procedure according to some example embodiments of the invention;

FIG. 7 illustrates multi beam-pairs operation according to some example embodiments of the invention;

FIG. 8 illustrates determination of r1 and r2 in a multi-beam pairs measurement according to some example embodiments of the invention;

FIG. 9 illustrates a message flow according to some example embodiments of the invention;

FIG. 10 shows an apparatus according to an example embodiment of the invention;

FIG. 11 shows a method according to an example embodiment of the invention;

FIG. 12 shows an apparatus according to an example embodiment of the invention;

FIG. 13 shows a method according to an example embodiment of the invention;

FIG. 14 shows an apparatus according to an example embodiment of the invention;

FIG. 15 shows a method according to an example embodiment of the invention;

FIG. 16 shows an apparatus according to an example embodiment of the invention;

FIG. 17 shows a method according to an example embodiment of the invention;

FIG. 18 shows an apparatus according to an example embodiment of the invention;

FIG. 19 shows a method according to an example embodiment of the invention;

FIG. 20 shows an apparatus according to an example embodiment of the invention;

FIG. 21 shows a method according to an example embodiment of the invention; and

Figure 22:
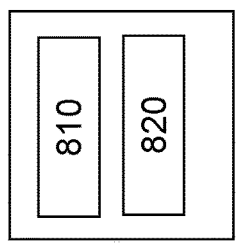

FIG. 22 shows an apparatus according to an example embodiment of the invention.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Prior art [e.g. REF 3] assumes ideal line-of-sight (LOS) conditions, while carrier phase measurements are highly sensitive to multi-path reception. The impact of the higher carrier frequencies (e.g. above 6 GHz) and beam-domain operation supported in NR to carrier phase positioning have not been considered in prior art. Specifically, transmit (TX) and receive (RX) beams may not be associated through a direct LOS channel and even the same gNB and UE may be associated through several beam pairs. Such NLOS conditions are to still be addressed. Additionally, the fact that, different from GNSS, the carrier phase based positioning in NR may benefit from signalling exchange between gNB and UE via exploiting the two-way communication has neither been considered. Some exemplified problems/challenges are listed here:

Problem 1): how to address the scenarios where a gNB and the UE are associated through several beam pairs.

Problem 2): how to effectively schedule/allocate resources (specific C-PRS and other transmit/receive resources) and to take proper proactive (to mitigate possible channel impairments) and/or reactive (to further refine measurements' accuracy) actions Problem 3): how to address the scenarios where transmit (TX) and receive (RX) beams are not associated through a direct LOS channel Problem 4): how to efficiently reduce the number of C-PRS measurements given i) the limited set of available carrier frequencies to serve a certain UE and/or ii) the limited time to perform/report the measurements because of the strict latency constraints imposed by many 5G and beyond scenarios.

The prior art leaves open, for example, how to incorporate carrier-phase measurements in the context of the beam domain operation. Note also that in GNSS systems, for which carrier-phase measurements have been traditionally adopted for accurate positioning, there is no support for beam domain operation available.

Some example embodiments of this invention are related to at least one of four different procedures related to beam domain operation of carrier phase measurements and reporting. More specifically, 1) DL TX beam specific virtual carrier selection
2) virtual carrier relative phase difference measurement (i.e., measurement of a local or non-local virtual phase difference)
3) virtual carrier selection reporting, and
4) virtual phase difference reporting procedures for UE.

The procedures enable high precision network-based positioning (e.g. in 3GPP NR Rel-18 and beyond).

An available coarse position estimate of the target UE (obtained through standard procedures) may be refined by a network assisted carrier phase measurement mechanism according to some example embodiments of this invention.

For the present application, a reference signal (RS) is a modulated sequence that is associated with configured transmission resources in time and frequency. RS can be used at receiver to estimate parameters of a radio channel (e.g. phase or channel state information) or implementation impairments (e.g. phase noise or frequency offset) introduced by a transmitter or/and a receiver. Examples of RS that may be employed on some example embodiments of the invention are positioning reference signal (PRS); phase tracking reference signal (PTRS), or non-zero-power channel state information reference signal (NZP-CSI-RS) for time-and frequency tracking or NZP-CSI-RS for beam management, NZP-CSI-RS for channel state information acquisition, demodulation reference (DMRS) for PDSCH/PDCCH. Furthermore, a reference signal that may be employed in some example embodiments may be any combination of at least two different reference signal types. Moreover, reference signal can be also new one which is not yet defined in the current New Radio specification.

For the present application, a signal is a modulated sequence that is associated with configured transmission resources in time and frequency. Typically, in comparison with reference signal, the signal is used to detect or identify some parameters of the system, for example cell identify or frame time (for example PSS or SSS). However, the use of signal is not restricted for the use identifying system parameters but it can be used also for channel estimation purposes.

The term "signal/RS" used further below may include at least one of the following meanings:
a combination of two or more signals;
a combination of two or more reference signals;
a combination of an arbitrary number n of signals with an arbitrary number m of reference signals (n, m≥1).

Some example embodiments of the invention comprise at least one of the following components and steps:

DL TX beam specific virtual carrier selection procedure for the UE: Thus, the set of tones defining a virtual carrier ("virtual tone set") are selected according to pre-configured selection criteria. One tone corresponds to a subcarrier of transmission bandwidth with a carrier frequency. The tone is associated with the resource of a signal/reference signal which can be used for estimation and/or detection purposes, for example, phase estimation, time-frequency tracking etc. One virtual tone set comprises of at least two candidate tones that may be used at a receiver (e.g. UE) for a definition of a virtual carrier. The number of candidate tones and their location in frequency and time can be configured by the network. In a virtual carrier, at least two tones from a virtual tone set are used to define the virtual carrier.

Pre-configured virtual carrier selection criteria is defined as:
M-best virtual tone sets are associated with resources of signal/RS associated with the virtual carrier. Preferably, the virtual carrier satisfies a pre-configured condition, such as $\lambda_v \geq 2\rho$, for example.
where signal/RS can be existing or new one. For example: PRS, where the resource of the positioning reference signal (DL) can be configured with some specific resource element pattern, e.g. comb-8 (every $8^{th}$ resource element of the physical resource block (12 resource elements) (there are plenty of other resource element patterns available in the specification), or combination of different RSs (e.g. PRS+PTRS), or new RS/signal.
where the cardinality of each virtual tone set, K, may be configured by network (or predefined) and $\rho$ defines TX-RX beam pair specific uncertainty (i.e., the radius of the uncertainty region) which is determined by UE by a preliminary position estimation, e.g. based on ToA; UE may have informed the network on ρ. A "virtual tone set" is the set of tones for generating the respective virtual tone.
  alternatively, when configured, UE may select autonomously K (size of virtual tone set) tones associated with resource of a signal/RS satisfying the pre-configured condition for the selection.
  In the aforesaid implementations, the signal/RS can be periodic/semi-persistent/aperiodic.
DL TX beam specific virtual phase difference measurement procedure for UE:
  In some example embodiments, the network configures an anchor resource with respect to which the relative phase measurements of other TRPs/cells are performed. An anchor resource is a certain reference resource associated with for example a transmission reception point (TRP) or other gNB with respect to which relative virtual phase difference measurements associated with virtual carriers are computed. This reminds RSTD (reference signal time difference) measurement) use in OTDOA positioning techniques. However, here, the measurement is performed between virtual phases and not with time domain measurements.
  The network may also configure reference resources of a signal/RS associated with other TRP/cells for virtual phase difference measurement.
    The resources of the reference signal can be allocated in a periodic/semi-persistent/aperiodic manner.
  UE shall perform phase measurement based on the selected/qualified virtual set of tones defining the virtual carrier associated with anchor/reference signal/RS resource.
    For example, the UE determines the phase associated with the virtual carrier as follows: by computing arc Tan of ratio between the imaginary and real parts for the set of tones defining virtual carrier. UE may use any phase tracking method to determine the phase.
    If the NLOS correction is configured for virtual carrier phase measurement, an additional phase correction is added to the phase measurements. For example, the phase correction may be π (radians). Details are explained further below.
Virtual carrier selection measurement report for the UE:
  Report may comprise at least one of the following elements (up to the network)
    Information element including the M-best virtual tone sets for each TRP;
      For example, bit map vector with length of M is defined where each element of vector is associated with one-to-one mapping with virtual tone set (0=not selected/1=selected).
    Information element including M different measurement error statistics values (σv) associated with M-best virtual carrier sets for each TRP/gNB
    When the autonomous virtual carrier selection per virtual tone set is configured, UE is allowed to select autonomously different tones defining a virtual tone out of K tones in the set; for each M configured virtual tone set, a bitmap vector length of K may be reported, where each such element of length K vector is associated with one-to-one mapping with preconfigured tone locations (0=not selected/1=selected). Other reporting options are feasible, too.

Figure 4:
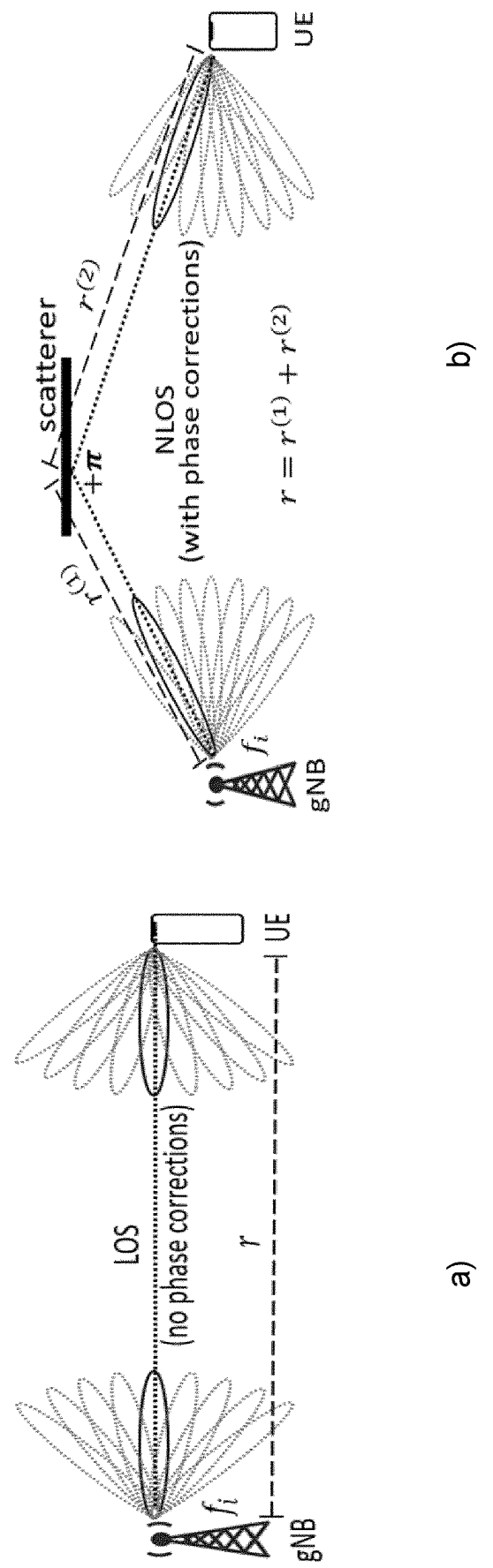
FIG. 4 illustrates typical setups with multiple transmit and receive beams— a) LOS beam-pair; b) NLOS beam-pair.

If a beam pair is NLOS, the phase measurements need to be corrected to counteract the phase change due to reflection, while the LOS beam phase measurements remain intact (see FIG. 4a). The corrective phase shifting in case of NLOS can be (at least initially) set to π radians (half-wavelength), which is the phase shift (phase jump) experienced by a light beam in the vacuum when reflected from a surface of a medium with higher refractive index than that of the medium in which it is travelling. Note that assuming the air as the traveling medium, any reflection of a light beam will be surely on a surface/medium with higher refractive index, thus, a π radians phase jump will occur. In case of electromagnetic radio waves, the exact phase shift introduced by the reflection is given by
, reflection phase offset=a tan 2(Im($R_\perp$),Re($R_\perp$))

$$R_\perp = \frac{\cos(\theta) - \sqrt{\varepsilon - \sin^2(\theta)}}{\cos(\theta) + \sqrt{\varepsilon - \sin^2(\theta)}}$$

where a tan 2 is the two-argument arctangent, $\varepsilon = \varepsilon_r - j6\tilde{\sigma}\lambda$, $\varepsilon_r$ is the normalized relative dielectric constant of the reflective surface, $\lambda$ is the carrier wavelength, $\theta$ is the incidence angle, and $\tilde{\sigma}$ is the conductivity of the reflective surface. In general, $\varepsilon_r > 1$ and $\tilde{\sigma} > 0$, but for the cases of interest in the present case (solid materials that do not cause too much attenuation to the incident signal), we have $\tilde{\sigma} > 1$ The reflection phase offset can be further mitigated (but typically not completely) via differential technique (using traditional local virtual carrier). The phase shift approaches π radians as the carrier frequency increases. The phase shift at 30 GHz is very close to the one experienced by the light propagating in the vacuum (solid line). Based on this, the phase shift can be even (iteratively) adjusted to increase the estimation accuracy by exploiting the information of the incidence angle once the scatterer/reflector locations are estimated as a by-product of the UE position estimate (see below).

In many cases, it is sufficient to assume that the introduced phase shift equals π radians as illustrated in FIG. 4b. In FIG. 4b, r is the total geometric length of the beam-pair link; $r^{(1)}$ and $r^{(2)}$ are the geometrical lengths from the scatterer to gNB and UE, respectively, in case of a NLOS beam with a single reflection at a scatterer. $r = r^{(1)} + r^{(2)}$.

Note that, different from GNSS, cellular systems may allow tuning transmit/receive system parameters and limit the carrier phase measurement errors, specified via its standard deviation given in (1) and (3) for single and double carrier transmissions, respectively. A signalling/info exchange between the gNB and the target UE is used to properly assign the carrier frequencies and set the transmit/receive hardware parameters, i.e., T,C (via power boost), to
  attain the desired level of error uncertainty, specified via its standard deviation; and
  discard ambiguity-based solutions. This can be done by adopting carrier frequencies such that $\lambda_v \geq 2\rho$. In case that uncertainty regions based on prior information knowledge are not circular as ideally considered here, it is straightforward to modify this constraint accordingly.
  If $\lambda_v \geq 2\rho$, the total number of virtual cycles $N_v$ is easily determined and a more accurate geometric distance estimate is given by $r = N_v \lambda_v + \phi_v \lambda_v$, where $\phi_v, \phi_i - \phi_j$ is the virtual phase measurement, and $\phi_i$ is the phase measurement corresponding to carrier $f_i$. In the case of a NLOS beam-pair, $r=r^{(1)}+r^{(2)}$ as illustrated in FIG. 4b (note that the measurements are the end-to-end path length r, and not the individual $r^{(1)}$ and $r^{(2)}$, is being estimated. $r^{(1)}$ and $r^{(2)}$, thus the scatterer location is obtained as a by-product of the target UE positioning computation). A possible scheduling procedure is illustrated in FIG. 5. An estimate of C, $\tilde{C}$, is available via previously conducted per-beam RSRP measurements, while a default T is known in advance by the network, represented e.g. by gNB. It may be associated with the UE class. Furthermore, the network knows the radius p of the preliminary uncertainty region. E.g., UE may have informed the network about ρ.

The carriers can be allocated within the guard intervals of the frequency bands for data (control data and/or user data) transmission or any reference signal or even within these frequency bands (e.g. at a center frequency thereof) as (nearly) pure sinusoids, herein referred to as the C-PRS signals. Therefore, the carriers allocation procedure would significantly benefit from the different numerology available in NR.

Using above methods, it is possible to improve the beam-pair range estimate by using multi-carrier transmissions (for each beam-pair), and consequently improve the positioning estimate when combining multiple distance measurements (corresponding to other beam-pairs within the same gNB and/or neighbouring cells). The impact of clock offsets in both transmitter and receiver can be alleviated using differential techniques, e.g., similar to TDOA.

FIG. 5 illustrates the open-loop case: the gNB allocates the transmit resources based on prior information. There is no carrier-phase related feedback from the UE. In a more elaborated implementation, as illustrated in FIG. 6, although the gNB may (or may not) use a prior information, the UE evaluates the expected accuracy of the carrier phase measurements (via received power measurements and filter integration time information) and requests further correcting actions to the gNB such as: additional power boost, extending the integration time, and/or using more carriers per-beam. In FIG. 6, the resource allocation follows a principle similar to that illustrated in FIG. 5.

On the Multiple Beam-Pairs Measurements

Multiple distance measurements (combined with AoA and AoD information) are typically used for estimating the target UE position. In an example implementation, two beam-pairs corresponding to the same gNB may be used and illustrated in FIG. 7. In FIG. 7, both beam pairs are NLOS. However, the case of 1 NLOS beam-pair and 1 LOS beam-pair is also valid, as well as more than 2 beam-pairs.

Figure 1:
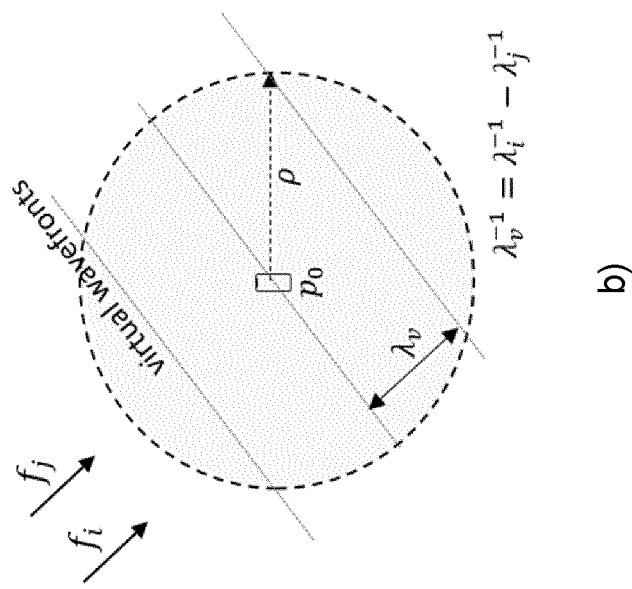
FIG. 1 shows wavefronts in case of single carrier transmission and virtual wavefronts in case of multi-carrier transmission over an uncertainty region where a receiver may be located.
Figure 1:
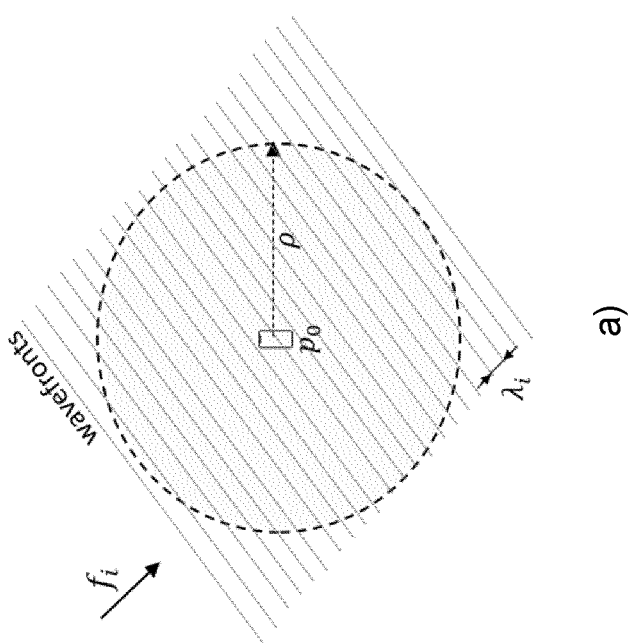
Figure 2:
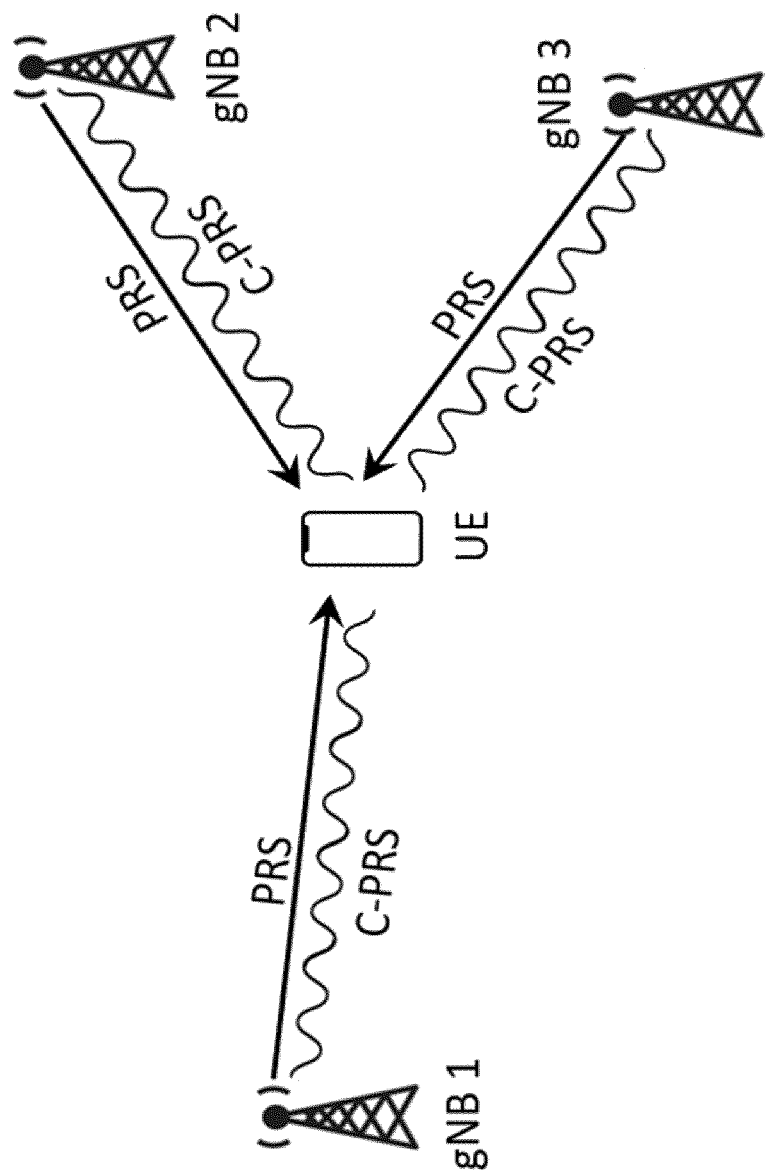
FIG. 2 illustrates downlink carrier phase positioning, taken from [REF 3]
Figure 3:
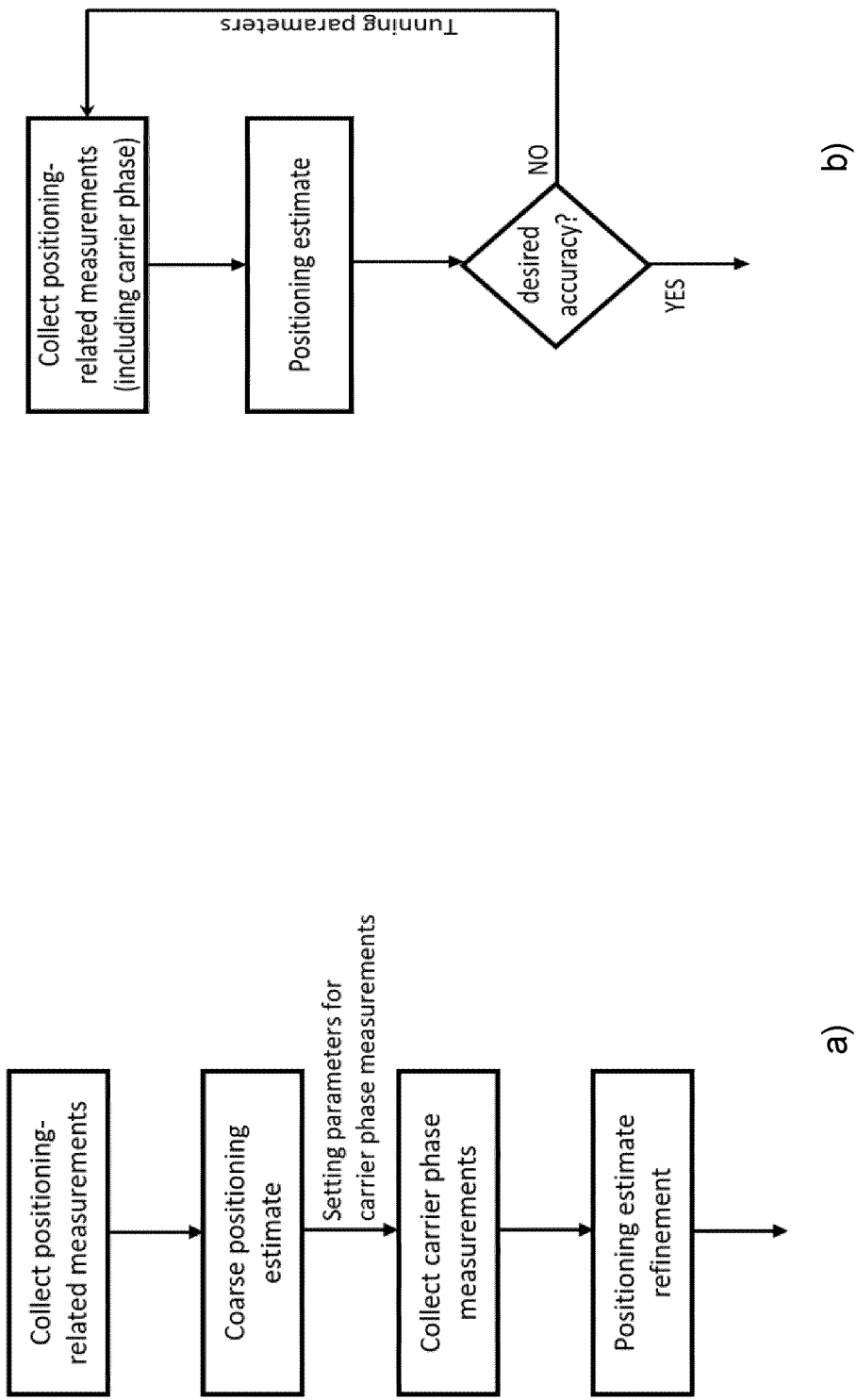
FIG. 3 illustrates implementation alternatives of methods according to some example embodiments of the invention.

Herein, we assume that multiple beam-pairs are simultaneously used, which permits taking advantage of the multiple RF chains, to possibly reduce the latency of the positioning techniques procedures by collecting measurements in parallel. Then, the same carrier frequencies cannot be reused along different beam-pairs (should be considered when resource scheduling in FIGS. 3 and 4).

When multiple carriers are allocated to each beam-pair, the procedure for improving the positioning estimate reuses the procedure for link distance accuracy improvement described previously. Therein, the distance estimate of each link ($r_1$ and $r_2$ in FIG. 7) can be improved individually. Thus, the target UE position estimate will improve.

However, it could be the case that one or several beam-pairs are associated with single carriers. The reasons may be diverse, e.g.,
- extremely limited set of available carrier frequencies;
- hardware limitations (specially at the UE side); and/or
- limited time to perform/report the measurements.

Let us assume the extreme case where one carrier per beam-pair is assigned, $f_1/f_2$, to the beam pair with distance $r_1/r_2$, respectively. Then, the time and carrier phase measurement equations for the two beam-pairs are given by $$cT_1 = r_1 + n_1, \quad (4)$$

$$cT_2 = r_2 + n_2, \quad (5)$$

$$\lambda_1(\phi_1 + \tfrac{1}{2}) = r_1 + \lambda_1 N_1 + w_1, \quad (6)$$

$$\lambda_2(\phi_2 + \tfrac{1}{2}) = r_2 + \lambda_2 N_2 + w_2, \quad (7)$$

where $n_1$ and $n_2$ are the TOA measurement errors corresponding to beam-pairs 1 and 2, respectively, and c is the speed of light. Notice that $\sigma_{n_i} \gg \sigma_i$. By multiplying (6) and (7) by $\lambda_2/(\lambda_2-\lambda_1)$ and $-\lambda_1/(\lambda_2-\lambda_1)$, respectively, and adding both equations, one attains (the adding term ½ in (6) and (7) corresponds to the phase correction introduced because of the NLOS characteristic of both beam-pairs)

$$\lambda_v \phi_v = r_v + \lambda_v N_v + w_v, \quad (8)$$

where $\lambda_v$ is again a virtual wavelength, though it is not associated to a single beam-pair link and thus differs from the traditional virtual wavelength definition and its corresponding geometric interpretation, while its mathematical formulation is similar. We refer to it as a non-local virtual wavelength. Note that $r_v$ in this case is a virtual distance, which is given by $$r_v = \frac{r_1 \lambda_2 - r_2 \lambda_1}{\lambda_2 - \lambda_1}, \quad (9)$$

$N_v = 2 - N_1$, and $w_v$ is given in (2). $\sigma_v$ can be limited using the same resource allocation principles previously discussed, such that the impact of $w_v$ in (8) can be neglected. Then, one reaches $\lambda_v \phi_v \approx r_v + \lambda_v N_v$. Using the latter equation, one can refine (make more accurate predictions of) the values of $r_1$ and $r_2$ coming from (4) and (5) by using the time measurements information, e.g., by pondering the $r_1$ and $r_2$ estimates according to the predicted TOA error standard deviations, or even Kalman filtering when several set of measurements are available. This procedure is illustrated next in the algorithm shown in Table 1. Note that $f_1$ and $f_2$ must satisfy $\lambda_v \geq 2\rho$, while it is also desirable that $|f_1-f_2|$ be large to make the prediction in step 2 more accurate. These two aspects may be used in the carrier allocation.

TABLE 1

Algorithm 1 - Carrier phase-based distance estimate using single carriers per beam 1 Allocate radio resources so as to reduce the impact of $w_v$ to the desired level. This may require, e.g., proper carrier allocation, power boosting and/or properly setting filter integration time.

2 Use $T_1$, $T_2$ to estimate $r_v \approx \dfrac{c}{\lambda_2 - \lambda_1}(T_1\lambda_2 - T_2\lambda_1)$.

It is desirable to have $|f_1 - f_2|$ the as large as possible to mitigate the impact of the time measurement noise. This can be also used as the criterion for carrier allocation before step 1.

TABLE 1-continued

Algorithm 1 - Carrier phase-based distance estimate using single carriers per beam 3 Estimate $N_v = \text{floor}(r_v/\lambda_v)$.
4 Improve the prediction of $r_v$ by using carrier phase measurements. $r_v = \lambda_v(\phi_v + N_v)$.
5 Improve $\hat{r}_1$ and $\hat{r}_2$ estimates in (4) and (5) by using the virtual distance constraint given in step 4. In the simplest way, one can simply linearly project the raw estimates $\hat{r}_1$ and $\hat{r}_2$ on the line defined by (9) (FIG. 8). Alternatively, one can take advantage of the TOA error standard deviations to solve a non-linear program and make more accurate predictions (Table 2). One can even use Kalman filtering if several sets of measurements are available.

TABLE 2

Determining r1, r2 in a multi-beam pairs approach - Non-linear projection based on time error statistics (standard deviation) (bottom), to improve the estimates of $r_1$ and $r_1$ based on the virtual distance estimate (output of step 4 in Algorithm 1)

The raw estimates of $r_1$ and $r_2$, say $\hat{r}_1$ and $\hat{r}_2$ can be interpreted as drawn from a Gaussian distribution $N(r_1, \sigma_{n_1})$ and $N(r_2, \sigma_{n_2})$, respectively. The goal is to find $r_1$ and $r_2$ subject to (9) such that a certain distance metric of the raw estimates $\hat{r}_1$ and $\hat{r}_2$ with respect to $r_1$ and $r_2$ is probabilistically the minimum. The optimization can be formulated as Multi-objective optimization minimize: $\left\{ \left| \Phi\left(\frac{\hat{r}_1 - r_1}{\sigma_{n_1}}\right) - \frac{1}{2} \right|, \left| \Phi\left(\frac{\hat{r}_2 - r_2}{\sigma_{n_2}}\right) - \frac{1}{2} \right| \right\}$ subject to: $\dfrac{r_1 \lambda_2 - r_2 \lambda_1}{\lambda_2 - \lambda_1} = r_v$ ($r_v$ is given as output of step 4 in Algorithm 1) $r_1, r_2 \geq 0$
where $\Phi(.)$ is the CDF of a standard normal distribution.

Some example embodiments of the invention provide a method and/or an apparatus for using carrier-phase based measurements along with beam domain information and other positioning-related measurements to improve the accuracy of the UE positioning estimate, e.g. in 5G NR deployment scenarios.

In some example embodiments of the invention, it is assumed that a TX beam ranking and selection procedure has been carried out in advance. The spatial directions, which may correspond to one or even several transmitters (several gNBs or transmission reception points (TRPs) in case of downlink beams), are ranked according to a predefined criterion. For instance, such beam ranking criteria can be based on already employed physical-layer information in time and spatial angular domain in addition to RSRP-based information. For instance, ranking can be based on i) received signal information, i.e., prioritizing beam directions with higher RSRP; ii) angular information, i.e., prioritizing beam directions with higher spatial separation associated with, e.g., the AoA and/or the AoD at the UE-side; iii) time information, i.e., prioritizing beam directions with shorter ToF; iv) UE speed and known/predicted direction of moving, i.e., prioritizing beams in the direction where the UE is moving; or v) any hierarchical selection and/or weighted combination of the previous information. The lowest ranked beam (e.g. with low RSRP and most likely bouncing at scatterers more than once) or the n lowest ranked beams with n predefined and n≥1 should be completely discarded. The remaining beams (or a subset) are hereafter the subset of TX beams that may be used to estimate the position of a target node, e.g. to refine any previous course estimate. Typically, the subset comprises the highest ranked beams. The rank at and below which beams are discarded may be considered as a suitability threshold. I.e, the select beams are better than suited than the suitability threshold.

In some example embodiments of the invention, a ranking may be omitted. Instead, the beams may be selected according to the RSRP. If RSRP is larger than a predefined RSRP threshold, it is assumed that the beam is LOS or not scattered more than once. In some example embodiments, if the UE and the base station are associated by plural beams, one may determine the maximum RSRP. Probably, the related beam is LOS or scattered only once. Furthermore, it is assumed that all beams having RSRP larger than a predefined fraction of the maximum RSRP (RSRP threshold, e.g. 80% or 70% of the maximum RSRP) are scattered not more than once. Hence, these beams (or a subset of these beams) are selected while the beams with lower RSRP are discarded. I.e., the RSRP threshold may be considered as a suitability threshold.

Correspondingly, the beams may be selected according to their AoA at the UE. For example, if one assumes that the beam with highest RSRP is LOS, the other beams may be selected only if their AoA deviates from the LOS by not more than a predefined angle threshold (such as 10° or 20°). I.e., the predefined angle may be considered as a suitability threshold. Of course, the criteria larger than RSRP threshold and AoA deviating not more than angle threshold may be combined by logical AND or logical OR, thus defining another suitability threshold.

As aforesaid, some example embodiments of the invention may be used along with any other positioning procedure of the target UE, such as those available today. In such case, the carrier phase measurements are strictly used to refine the positioning estimate of the target UE as illustrated in FIG. 3a. Alternatively, all positioning-related measurements can be jointly collected and used to make a relatively accurate prediction of the target UE, which can be later refined (if needed) via properly tuning system parameters before taking a new (possibly reduced) set of positioning-related measurements as illustrated in FIG. 3b. Next, an overview of the key steps of the proposed carrier phase assisted positioning is provided by considering two alternative implementations: i) the 'separate approach' illustrated in FIG. 3a, and ii) the 'combined approach' shown in FIG. 3b.

It is worth noting that above procedure can be enriched if other positioning related measurements are considered, e.g., angular information. Also, note that all the described procedures are meant to improve link distance estimates, which will eventually lead to more accurate UE positioning estimates when combined with further positioning-related measurements.

The impact of clock offsets may be mitigated by employing multiple-differential techniques, similar to TDOA.

In some example embodiments, the UE may report the result of the virtual phase difference measurement of the (local or non-local) virtual wavelength to the network (e.g. LMF) such that the network estimates the location of the UE based on the result of the virtual phase difference measurement and the location(s) of the TRP(s) of which (reference) signals were used to generate the virtual wavelength. In some example embodiments, the UE may determine at least a distance from a TRP from which the (reference) signals for generating the virtual wavelength are transmitted. If the network provides the location of the TRP, the UE may even determine the location of itself, if the beam direction is known. In any case, for determining the location, the network and the UE, respectively, may additionally use the uncertainty region determined by some other location estimation.

Separate approach: A coarse positioning procedure of the target UE is already available (see FIG. 3a).

The prior position estimate could have been acquired via any other procedure employing, e.g., time, angular, or other measurements in a beam-based or beam-free implementation. As a result, the target UE is expected to be in the vicinity of the predicted position $p_0$. Without loss of generality, let us assume an uncertainty radius $\rho$ around $p_0$.

There is an available set of carrier-frequencies (C-PRSs) $F=\{f_1, f_2, \ldots, f_N\}$ with $f_1<f_2<\ldots<f_N$ that may be used for carrier-phase based measurements. This set is pre-configured with other nearby gNBs or LMF to avoid inter-cell carrier contamination and may be influenced by the target UE class (to ensure that the UE is capable of taking carrier phase measurements for every $f_i \in F$ if necessary, its local clock and PLL can accurately tune/track these frequencies).

Let us assume a certain beam-pair has been assigned to the carrier frequency $f_i \in F$. Insights on the proper carrier allocation per beam pair is discussed later. Then, Carrier phase measurements at such carrier frequencies are taken at the UE;

Based on the prior UE positioning information and the TX & RX beams orientation, the beam pair is classified as LOS, or NLOS (which refers to a single-scatterer NLOS, since beams undergoing multiple bounces have been already potentially discarded as it is assumed that they are low ranked);

If the beam pair is NLOS, the phase measurements need to be corrected by phase shifting them by radians (half-wavelength), while the LOS beam phase measurements remain intact, as described above.

Combined approach: All positioning-related measurements are jointly collected and processed, as shown in FIG. 3b).

This case estimates the target position assisted by carrier phase measurements using implementation principles similar to the ones used in the previous case.

Here, we assume there is an available set of carrier-frequencies (C-PRSs) $F=\{f_1, f_2, \ldots, f_N\}$ that may be used for carrier-phase based measurements. The carrier scheduling must be carried out such that the virtual wavelength per beam or collection of beams, in case of multiple or single carrier per beams, respectively, is larger than a certain threshold $\tilde{\rho}$, which can be interpreted as the maximum uncertainty expected from non-phase related positioning measurements and can be set to several/tens meters. Note that an accurate estimate of $\tilde{\rho}$ is not available (different from the 'separate approach' where $\tilde{\rho}=2\rho$ is assumed known in advance), since there is no prior positioning information, hence one must assume conservative values.

Moreover, the gNB transmits all positioning related signals, while the UE collects the respective measurements. The non-phase related measurements are used to establish initial "coarse" distance estimates, classify the beams in LOS and NLOS, and resolve the integer ambiguity factor for processing the carrier phase-based measurements as previously discussed in the 'separate approach' case. If the UE estimates the distances/position, it can also determine if the expected accuracy is good enough and terminate the positioning procedure. Conversely, if the UE reports back the measurements to the gNB for their processing, the latter can decide to terminate the positioning procedure. When the desired accuracy is not met (good enough), the gNB(UE) can re-tune the system parameters (the UE can request the gNB to refine its position estimate). Since prior positioning information is now available, one can use the same principles/procedures discussed previously for the 'separate approach' at this point.

In some example embodiments of the invention, an uncertainty region may not be needed at all. Namely, the UE may perform two relative phase measurements:

a first relative phase measurement based on one of the physical wavelengths ($\lambda_i$, $\lambda_j$);

a second relative phase measurement based on the (or non-local) virtual wavelength.

Typically, these wavelengths are not commensurate. Therefore, there is only one location where both phases are those determined by the two phase measurements. This location is the location of the UE (or at least, it estimates the distance from the TRP to the UE). In order to enhance accuracy, UE may perform a third relative phase measurement based on the other of the physical wavelengths, and take this measurement into account for estimating the location (distance).

If the phase measurement result does not fit exactly, a least square fit may be used to estimate the location (distance) from the two or three relative phase measurements.

FIG. 9 shows a message flow according to some example embodiments of the invention. As shown in FIG. 9, the LMF determines the relevant TRPs (here: TRP1, TRP2, TRP3), which transmit the PRS periodically. Furthermore, LMF configures UE to measure the PRS. Then, the TRPs transmit the respective PRS periodically.

The UE selects the tones used for generating the virtual carrier, and determines the uncertainty region based on another measurement. In addition, it may perform a relative virtual phase-difference measurement between the anchor resource and the reference resources selected for the generation of the virtual wavelength. The UE reports the result of these determinations and measurements back to the network (LMF).

Based on the determined tones reported by the UE, LMF determines the corresponding PRSs or at least two PRSs associated with their own resources. If the UE reports a result of a relative virtual phase measurement, too, LMF may additionally estimate provisionally a location of the UE. In order to increase the accuracy of the location estimation, LMF may instruct the TRPs to transmit the tones selected by the UE to extra-boost the transmission power of these tones. The TRPs transmit the PRS with extra-transmission power boost, which is typically aperiodic of its time nature (A-PRS=aperiodic PRS). The A-PRS are indicated to the UE by downlink control information (DCI) of PDCCH.

Then (i.e., after UE was informed about A-PRS), UE performs the relative phase measurement using the (local or non-local) virtual wavelength. For example, the UE may perform the measurement relative to the anchor. UE reports the measurement result to LMF. Best on this result, LMF refines the estimation of the location of the UE (or determines it the first time). LMF may inform UE on its location.

The communication between LMF (representing the network) and UE is via the base station (e.g. gNB, eNB) serving the UE (not shown in FIG. 9).

FIG. 10 shows an apparatus according to an example embodiment of the invention. The apparatus may be a terminal such as a UE, or an element thereof. FIG. 11 shows a method according to an example embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises means for selecting 110, means for determining 120, means for performing 130, and at least one of means for reporting 140 and means for estimating 141. The means for selecting 110, means for determining 120, means for performing 130, means for reporting 140, and means for estimating 141 may be a selecting means, determining means, performing means, reporting means and estimating means, respectively. The means for selecting 110, means for determining 120, means for performing 130, means for reporting 140, and means for estimating 141 may be a selector, determiner, performer, reporter, and estimator, respectively. The means for selecting 110, means for determining 120, means for performing 130, means for reporting 140, and means for estimating 141 may be a selecting processor, determining processor, performing processor, reporting processor, and estimating processor, respectively.

The means for selecting 110 selects a subset of one or more beam pairs among a set of beam pairs via which a terminal and a base station are associated (S110). For each of the beam pairs of the subset, a suitability of the respective beam pair is better than a suitability threshold.

The next actions (S120 to S141) may be performed per beam pair of the subset.

For each of the selected beam pairs of the subset, the means for determining 120 determines a respective set of at least two tones (S120). For example, the at least two tones may be selected such that a respective virtual wavelength $\lambda_v$ generated from the at least two tones fulfills a condition $\lambda_v \geq 2\rho$. $\rho$ is a distance from a respective predicted position of the terminal to a boundary of the respective preliminary uncertainty region of the predicted position of the terminal. For example, if the uncertainty region is a circle around the predicted position, $\rho$ is the radius of the circle.

For each of the selected beam pairs of the subset, the means for performing 130 performs a respective relative phase measurement based on the respective virtual wavelength generated by the selected tones (S130). Thus, a respective virtual phase difference is obtained.

For each of the selected beam pairs of the subset, the means for reporting 140 reports the respective set of at least two tones and the respective virtual phase difference to the base station (S140).

For each of the selected beam pairs of the subset, based on the respective virtual phase difference and the preliminary uncertainty region, the means for estimating 141 estimates a respective distance between the terminal and a transmission reception point of the base station emitting the respective beam pair (S141).

In some example embodiments of the invention, only one of S140 and S141 is performed. In some example embodiments of the invention, both of S140 and S141 are performed. In these example embodiments, the sequence of S140 and S141 is arbitrary. They may be performed fully or partly in parallel.

FIG. 12 shows an apparatus according to an example embodiment of the invention. The apparatus may be a terminal such as a UE, or an element thereof. FIG. 13 shows a method according to an example embodiment of the invention. The apparatus according to FIG. 12 may perform the method of FIG. 13 but is not limited to this method. The method of FIG. 13 may be performed by the apparatus of FIG. 12 but is not limited to being performed by this apparatus.

The apparatus comprises means for selecting 210, means for determining 220, means for performing 230, and at least one of means for reporting 240 and means for estimating 241. The means for selecting 210, means for determining 220, means for performing 230, means for reporting 240, and means for estimating 241 may be a selecting means, determining means, performing means, reporting means and estimating means, respectively. The means for selecting 210, means for determining 220, means for performing 230, means for reporting 240, and means for estimating 241 may be a selector, determiner, performer, reporter, and estimator, respectively. The means for selecting 210, means for determining 220, means for performing 230, means for reporting 240, and means for estimating 241 may be a selecting processor, determining processor, performing processor, reporting processor, and estimating processor, respectively.

The means for selecting 210 selects a subset of two or more beam pairs among a set of beam pairs via which a terminal and a base station are associated (S210). For each of the beam pairs of the subset, a suitability of the respective beam pair is better than a suitability threshold.

The next actions (S220 to S241) may be performed per beam pair of the subset.

For each of the selected beam pairs of the subset, the means for determining 220 determines a respective at least one tone (S220). In addition, it determines a tone of another beam pair. For example, the at least two tones may be selected such that a respective virtual wavelength $\lambda_v$ generated from the at least two tones fulfills a condition $\lambda_v \geq 2\rho$. $\rho$ is a distance from a respective predicted position of the terminal to a boundary of the respective preliminary uncertainty region of the predicted position of the terminal. For example, if the uncertainty region is a circle around the predicted position, $\rho$ is the radius of the circle.

For each of the selected beam pairs of the subset, the means for performing 230 performs a respective relative phase measurement based on the respective virtual wavelength generated by the selected tones (S230). Thus, a respective non-local virtual phase difference is obtained.

For each of the selected beam pairs of the subset, the means for reporting 240 reports the respective beam pair, the other beam pair, the set of tones and the respective non-local virtual phase difference to the base station (S240).

For each of the selected beam pairs of the subset, based on the respective non-local virtual phase difference and the preliminary uncertainty region, the means for estimating 241 estimates a respective distance between the terminal and a transmission reception point of the base station emitting the respective beam pair (S241).

In some example embodiments of the invention, only one of S240 and S241 is performed. In some example embodiments of the invention, both of S240 and S241 are performed. In these example embodiments, the sequence of S240 and S241 is arbitrary. They may be performed fully or partly in parallel.

FIG. 14 shows an apparatus according to an example embodiment of the invention. The apparatus may be a terminal such as a UE, or an element thereof. FIG. 15 shows a method according to an example embodiment of the invention. The apparatus according to FIG. 14 may perform the method of FIG. 15 but is not limited to this method. The method of FIG. 15 may be performed by the apparatus of FIG. 14 but is not limited to being performed by this apparatus.

The apparatus comprises first means for receiving 310, second means for receiving 320, means for performing 330, and at least one of means for reporting 340 and means for estimating 341. The first means for receiving 310, second means for receiving 320, means for performing 330, means for reporting 340, and means for estimating 341 may be a first receiving means, second receiving means, performing means, reporting means and estimating means, respectively. The first means for receiving 310, second means for receiving 320, means for performing 330, means for reporting 340, and means for estimating 341 may be a first receiver, second receiver, performer, reporter, and estimator, respectively. The first means for receiving 310, second means for receiving 320, means for performing 330, means for reporting 340, and means for estimating 341 may be a first receiving processor, second receiving processor, performing processor, reporting processor, and estimating processor, respectively.

The first means for receiving 310 receives, from a base station, an indication of a subset of one or more beam pairs among a set of beam pairs via which a terminal and the base station are associated (S310).

The next actions (S320 to S341) may be performed per beam pair of the subset.

For each of the beam pairs of the subset, the second means for receiving 320 receives an indication of a respective set of at least two tones from the base station (S320).

For each of the beam pairs of the subset, the means for performing 330 performs a respective relative phase measurement based on the respective virtual wavelength generated by the at least two tones (S330). Thus, a respective virtual phase difference is obtained.

For each of the beam pairs of the subset, the means for reporting 340 reports the respective virtual phase difference to the base station (S340).

For each of the beam pairs of the subset, based on the respective virtual phase difference and the preliminary uncertainty region, the means for estimating 341 estimates a respective distance between the terminal and a transmission reception point of the base station emitting the respective beam pair (S341).

In some example embodiments of the invention, only one of S340 and S341 is performed. In some example embodiments of the invention, both of S340 and S341 are performed. In these example embodiments, the sequence of S340 and S341 is arbitrary. They may be performed fully or partly in parallel.

FIG. 16 shows an apparatus according to an example embodiment of the invention. The apparatus may be a terminal such as a UE, or an element thereof. FIG. 17 shows a method according to an example embodiment of the invention. The apparatus according to FIG. 16 may perform the method of FIG. 17 but is not limited to this method. The method of FIG. 17 may be performed by the apparatus of FIG. 16 but is not limited to being performed by this apparatus.

The apparatus comprises first means for receiving 410, second means for receiving 420, means for performing 430, and at least one of means for reporting 440 and means for estimating 441. The first means for receiving 410, second means for receiving 420, means for performing 430, means for reporting 440, and means for estimating 441 may be a first receiving means, second receiving means, performing means, reporting means and estimating means, respectively. The first means for receiving 410, second means for receiving 420, means for performing 430, means for reporting 440, and means for estimating 441 may be a first receiver, second receiver, performer, reporter, and estimator, respectively. The first means for receiving 410, second means for receiving 420, means for performing 430, means for reporting 440, and means for estimating 441 may be a first receiving processor, second receiving processor, performing processor, reporting processor, and estimating processor, respectively.

The first means for receiving 410 receives, from a base station, an indication of a subset of two or more beam pairs among a set of beam pairs via which a terminal and the base station are associated (S410).

The next actions (S420 to S441) may be performed per beam pair of the subset.

For each of the beam pairs of the subset, the second means for receiving 420 receives an indication of a respective set of at least one tone from the base station (S420).

For each of the beam pairs of the subset, the means for performing 430 performs a respective relative phase measurement based on the respective non-local virtual wavelength generated by the indicated tone and a tone of another beam pair (S430). Thus, a respective non-local virtual phase difference is obtained.

For each of the beam pairs of the subset, the means for reporting 440 reports the respective non-local virtual phase difference to the base station (S440). In addition, it may report one or more of the tones used to generate the virtual wavelength and the respective beams.

For each of the beam pairs of the subset, based on the respective non-local virtual phase difference and the preliminary uncertainty region, the means for estimating 441 estimates a respective distance between the terminal and a transmission reception point of the base station emitting the respective beam pair (S441).

In some example embodiments of the invention, only one of S440 and S441 is performed. In some example embodiments of the invention, both of S440 and S441 are performed. In these example embodiments, the sequence of S440 and S441 is arbitrary. They may be performed fully or partly in parallel.

FIG. 18 shows an apparatus according to an example embodiment of the invention. The apparatus may be a base station such as a gNB, eNB etc., or an element thereof. FIG. 19 shows a method according to an example embodiment of the invention. The apparatus according to FIG. 18 may perform the method of FIG. 19 but is not limited to this method. The method of FIG. 19 may be performed by the apparatus of FIG. 18 but is not limited to being performed by this apparatus.

The apparatus comprises means for selecting 510, means for determining 520, means for transmitting 530, and means for informing 540. The means for selecting 510, means for determining 520, means for transmitting 530, and means for informing 540 may be a selecting means, determining means, transmitting means, and informing means, respectively. The means for selecting 510, means for determining 520, means for transmitting 530, and means for informing 540 may be a selector, determiner, transmitter, and informer, respectively. The means for selecting 510, means for determining 520, means for transmitting 530, and means for informing 540 may be a selecting processor, determining processor, transmitting processor, and informing processor, respectively.

The means for selecting 510 selects a subset of one or more beam pairs among a set of beam pairs via which a terminal and a base station are associated (S510). For each of the beam pairs of the subset, a suitability of the respective beam pair is better than a suitability threshold.

S520 and S530 may be performed per selected beam pair.

For each of the beam pairs of the subset, the means for determining 520 determines a respective set of at least two tones (S520). For example, the at least two tones may be selected such that a respective virtual wavelength $\lambda_v$ generated from the at least two tones fulfills a condition $\lambda_v \geq 2\rho$. $\rho$ is a distance from a respective predicted position of the terminal to a boundary of the respective preliminary uncertainty region of the predicted position of the terminal.

For each of the beam pairs of the subset, the means for transmitting 530 transmits the respective at least two tones (S530). The at least two tones are transmitted on a (downlink) beam of the respective beam pair.

The means for informing 540 informs the terminal on the determined subset of beams and the respective tones (S540). It may additionally inform on an integration time. The integration time may be predefined.

FIG. 20 shows an apparatus according to an example embodiment of the invention. The apparatus may be a base station such as a gNB, eNB etc., or an element thereof. FIG. 21 shows a method according to an example embodiment of the invention. The apparatus according to FIG. 20 may perform the method of FIG. 21 but is not limited to this method. The method of FIG. 21 may be performed by the apparatus of FIG. 20 but is not limited to being performed by this apparatus.

The apparatus comprises means for selecting 610, means for determining 620, means for transmitting 630, and means for informing 640. The means for selecting 610, means for determining 620, means for transmitting 630, and means for informing 640 may be a selecting means, determining means, transmitting means, and informing means, respectively. The means for selecting 610, means for determining 620, means for transmitting 630, and means for informing 640 may be a selector, determiner, transmitter, and informer, respectively. The means for selecting 610, means for determining 620, means for transmitting 630, and means for informing 640 may be a selecting processor, determining processor, transmitting processor, and informing processor, respectively.

The means for selecting 610 selects a subset of two or more beam pairs among a set of beam pairs via which a terminal and a base station are associated (S610). For each of the beam pairs of the subset, a suitability of the respective beam pair is better than a suitability threshold.

S620 and S630 may be performed per selected beam pair.

For each of the beam pairs of the subset, the means for determining 620 determines a respective set of at least one tone (S620). For example, the at least one tone may be selected such that a respective non-local virtual wavelength $\lambda_v$ generated from the at least one tone and a tone of another beam pair fulfills a condition $\lambda_v \geq 2\rho$. $\rho$ is a distance from a respective predicted position of the terminal to a boundary of the respective preliminary uncertainty region of the predicted position of the terminal.

For each of the beam pairs of the subset, the means for transmitting 530 transmits the respective at least one tone (S630). The at least one tone is transmitted on a (downlink) beam of the respective beam pair.

The means for informing 640 informs the terminal on the determined subset of beams and the respective tone (S640). It may additionally inform on an integration time. The integration time may be predefined.

FIG. 22 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 11, 13, 15, 17, 19, and 21 and related description.

Some example embodiments are explained with respect to a 5G network. However, the invention is not limited to 5G. It may be used in networks of other 3GPP generations, too, e.g. in previous generations such as 3G and 4G, and in forthcoming generations such as 6G, 7G, etc.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, a terminal, such as a UE, or a component thereof, an apparatus embodying the same, a method for controlling and/or operating the same, and computer program(s) controlling and/or operating the same as well as mediums carrying such computer program(s) and forming computer program product(s). It should thus be apparent that example embodiments of the present invention provide, for example, a network function or network element (e.g base station, such as a eNB or gNB, or a LMF), or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

All of the embodiments described in this Detailed description of certain embodiments are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. An apparatus comprising:
   one or more processors; and
   at least one memory storing instructions that, when executed by the one or more processors, causes the apparatus to:
   select a subset of one or more beam pairs among a set of beam pairs via which a terminal and a base station are associated, wherein for each of the beam pairs of the subset, a suitability of the respective beam pair is better than a suitability threshold;
   for each of the beam pairs of the subset:
      determine a respective set of at least two tones;
      perform a respective relative phase measurement based on a respective virtual wavelength to obtain a respective virtual phase difference; and at least one of
      report the respective set of at least two tones and the respective virtual phase difference to the base station; and
      estimate a respective distance between the terminal and a transmission reception point of the base station emitting the respective beam pair based on the respective virtual phase difference and the preliminary uncertainty region; and
      the respective set of at least two tones is determined such that a respective virtual wavelength $\lambda_v$ generated from the at least two tones fulfills a condition $\lambda_v \geq 2\rho$, wherein $\rho$ is a distance from a respective predicted position of the terminal to a boundary of a respective preliminary uncertainty region of the predicted position of the terminal;
      the respective distance between the terminal and the transmission reception point of the base station emitting the respective beam pair is estimated based on the respective relative phase measurement and the preliminary uncertainty region.

2. The apparatus according to claim 1, wherein the instructions, when executed by the one or more processors, further cause the apparatus to, for each of the beam pairs of the subset:
   perform a respective relative phase measurement based on at least one of the determined tones; wherein the respective distance between the terminal and the transmission reception point of the base station emitting the respective beam pair is estimated based on the respective relative phase measurement based on the respective virtual wavelength and based on the respective relative phase measurement based on the at least one of the determined tones.

3. The apparatus according to claim 1, wherein, for at least one of the beam pairs of the subset, the distance p from the respective predicted position of the terminal to the boundary of the respective preliminary uncertainty region of the predicted position is predetermined.

4. The apparatus according to claim 1, wherein the instructions, when executed by the one or more processors, further cause the apparatus to, for at least one of the beam pairs of the subset:
   determine the respective preliminary uncertainty region and the distance $\rho$ from the respective predicted position of the terminal to the boundary of the respective preliminary uncertainty region of the predicted position by a location measurement different from the respective relative phase measurement.

5. The apparatus according to claim 1, wherein the subset of the beam pairs comprises plural beam pairs, and the instructions, when executed by the one or more processors, further cause the apparatus to:
   determine a refined uncertainty region based on the distances obtained from the relative phase measurements of the beam pairs of the subset, wherein the terminal is located in the refined uncertainty region.

6. The apparatus according to claim 1, wherein the instructions, when executed by the one or more processors, further cause the apparatus to, for at least one of the beam pairs of the subset:
   report the distance $\rho$ from the respective predicted position of the terminal to the boundary of the respective preliminary uncertainty region of the predicted position to the base station; and/or
   report the tones of the respective subset to the base station.

7. The apparatus according to claim 1, wherein the instructions, when executed by the one or more processors, further cause the apparatus to:
   perform a ranking of the beam pairs of the set of beam pairs to generate a ranking list; wherein
   for each of the beam pairs, the suitability is the respective rank in the ranking list;
   the beam pairs of the subset are selected such that the subset does not comprise the n lowest ranked beam pairs of the set of beam pairs, n is a predefined integer, and n is equal to or larger than 1.

8. The apparatus according to claim 1, wherein the instructions, when executed by the one or more processors, further cause the apparatus to, for each of the beam pairs of the set of beam pairs:
   determine at least one of a respective reference signal received power; wherein
   the suitability comprises the reference signal received power; and wherein
   the respective beam pair is selected for the subset of the beam pairs if the respective reference signal received power is higher than a reference signal received power threshold.

9. The apparatus according to claim 8, wherein the reference signal received power threshold is predetermined, and an angle of arrival threshold is predetermined, respectively.

10. The apparatus according to claim 8, wherein the instructions, when executed by the one or more processors, further cause the apparatus to:
    determine a highest reference signal received power among the beam pairs of the set of beam pairs; and
    determine the reference signal received power threshold as a predefined percentage of the highest reference signal received power.

11. The apparatus according to claim 1, wherein the instructions, when executed by the one or more processors, further cause the apparatus to:
    determine a strongest beam pair having a highest reference signal received power among the beam pairs of the set of beam pairs; and determine an angle of arrival of the strongest beam pair; wherein the suitability comprises the angle of arrival; and wherein for each of the beam pairs of the set of beam pairs, the respective beam pair is selected for the subset of the beam pairs if the respective angle of arrival deviates from the angle of arrival of the strongest beam pair by not more than a predetermined angle of arrival threshold.

12. The apparatus according to claim 1, wherein, for at least one of the beams of the subset, the tones for generating the virtual wavelength and the non-local virtual wavelength, respectively, are determined among a predefined set of tones such that an absolute value of a difference of their frequencies is maximized.

13. The apparatus according to claim 1, wherein the instructions, when executed by the one or more processors, further cause the apparatus to, for each of the beam pairs of the subset:
  decide whether or not the beam pair is assumed to be a line-of-sight beam pair; and
  if the beam pair is not assumed to be a line-of-sight beam pair, take a phase jump into account in the relative phase measurement.

14. The apparatus according to claim 1, wherein each of the tones comprises at least a respective one of a position reference signal, a non-zero-power channel status information reference signal for tracking, a phase tracking reference signal, a non-zero-power channel status information reference signal for acquisition, a non-zero-power channel status information reference signal beam management, a synchronization signal block, primary synchronization signal, secondary synchronization signal and a demodulation reference signal.

15. The apparatus according to claim 1, wherein the instructions, when executed by the one or more processors, further cause the apparatus to, for at least one of the beam pairs of the subset:
  report the respective distance between the terminal and the transmission reception point of the base station emitting the respective beam pair to the base station.

16. An apparatus comprising:
  one or more processors; and
  at least one memory storing instructions that, when executed by the one or more processors, causes the apparatus to:
  select a subset of two or more beam pairs among a set of beam pairs via which a terminal and a base station are associated, wherein for each of the beam pairs of the subset, a suitability of the respective beam pair is better than a suitability threshold;
  for each of the beam pairs of the subset:
    determine a respective set of at least one tone to generate a respective non-local virtual wavelength from one of the tones of the set of at least one tone and a tone of another beam of the subset;
    perform a respective relative phase measurement based on the respective non-local virtual wavelength to obtain a respective non-local virtual phase difference; and at least one of
      report the set of tones, the respective beam pair and the other beam pair, and the respective non-local virtual phase difference to the base station; and
      estimate a respective distance between the terminal and a transmission reception point of the base station emitting the respective beam pair based on the respective non-local virtual phase difference and the preliminary uncertainty region; and
    the respective set of at least one tone is determined such that a respective non-local virtual wavelength $\lambda_v$ generated from the tones of two beams of the subset fulfills a condition $\lambda_v \geq 2\rho$, wherein $\rho$ is a distance from a respective predicted position of the terminal to a boundary of the respective preliminary uncertainty region of the predicted position of the terminal; and
    the respective distance between the terminal and the transmission reception point of the base station emitting the respective beam pair is estimated based on the respective relative phase measurement and the preliminary uncertainty region.

17. The apparatus according to claim 16, wherein the instructions, when executed by the one or more processors, further cause the apparatus to, for each of the beam pairs of the subset:
  perform a respective relative phase measurement based on one of the determined set of at least one tone;
  the respective distance between the terminal and the transmission reception point of the base station emitting the respective beam pair is determined based on the respective relative phase measurement based on the respective non-local virtual wavelength and based on the respective relative phase measurement based on the one of the determined set of at least one tone.

* * * * *